(12) United States Patent
Ren et al.

(10) Patent No.: US 11,839,998 B2
(45) Date of Patent: Dec. 12, 2023

(54) CRACK ENGINEERING AS A NEW ROUTE FOR THE CONSTRUCTION OF ARBITRARY HIERARCHICAL ARCHITECTURES

(71) Applicants: Hong Kong Baptist University, Hong Kong (HK); The Hong Kong University of Science and Technology, Hong Kong (HK); City University of Hong Kong, Hong Kong (HK)

(72) Inventors: Kangning Ren, Hong Kong (HK); Hongkai Wu, Hong Kong (CN); Zuankai Wang, Hong Kong (HK); Shuhuai Yao, Hong Kong (CN); Beng Ong, Hong Kong (HK); Wanbo Li, Hong Kong (HK); Zeyu Li, Hong Kong (HK); Han Sun, Hong Kong (HK); Chiu Wing Chan, Hong Kong (HK)

(73) Assignees: Hong Kong Baptist University, Hong Kong (HK); The Hong Kong University of Science and Technology, Hong Kong (HK); City University of Hong Kong, Hong Kong (HK)

( * ) Notice: Subject to any disclaimer, the term of this patent is extended or adjusted under 35 U.S.C. 154(b) by 429 days.

(21) Appl. No.: 17/078,102

(22) Filed: Oct. 23, 2020

(65) Prior Publication Data
US 2021/0122091 A1 Apr. 29, 2021

Related U.S. Application Data

(60) Provisional application No. 62/924,693, filed on Oct. 23, 2019.

(51) Int. Cl.
*B29C 39/38* (2006.01)
*B29C 39/00* (2006.01)
(Continued)

(52) U.S. Cl.
CPC ............ *B29C 39/003* (2013.01); *B29C 39/26* (2013.01); *B29C 39/36* (2013.01); *B29C 39/38* (2013.01);
(Continued)

(58) Field of Classification Search
None
See application file for complete search history.

(56) References Cited

U.S. PATENT DOCUMENTS

| | | | |
|---|---|---|---|
| 2005/0154567 A1* | 7/2005 | Jackman ................... | B81C 1/00 703/2 |
| 2007/0001090 A1* | 1/2007 | Abbas ................... | B29C 39/006 249/127 |
| 2015/0283079 A1* | 10/2015 | DeSimone ............. | A61K 47/34 428/220 |

OTHER PUBLICATIONS

Shim J., et al., "Controlled crack Propagation for Atomic Precision Handling of Wafer-Scale Two-Dimensional Materials", Science, Nov. 9, 2018, vol. 362, Issue 6415, pp. 665-670.
(Continued)

*Primary Examiner* — Matthew J Daniels
*Assistant Examiner* — Debjani Roy
(74) *Attorney, Agent, or Firm* — Idea Intellectual Limited; Margaret A. Burke; Sam T. Yip

(57) ABSTRACT

Three-dimensional (3D) hierarchical morphologies widely exist in natural and biomimetic materials, which impart preferential functions including liquid and mass transport, energy conversion, and signal transmission for various applications. While notable progress has been made in the design and manufacturing of various hierarchical materials, the state-of-the-art approaches suffer from limited materials selection, high costs, as well as low processing throughput. Herein, by harnessing the configurable elastic crack engineering-controlled formation and configuration of cracks in elastic materials, an effect normally avoided in various
(Continued)

industrial processes, the present invention provides a facile and powerful technique to enable the faithful transfer of arbitrary hierarchical structures with broad material compatibility and structural and functional integrity. The present invention provides a cost-effective, large-scale production method of a variety of flexible, inexpensive, and transparent 3D hierarchical and biomimetic materials.

13 Claims, 26 Drawing Sheets

(51) Int. Cl.
  *B29C 39/36* (2006.01)
  *B29C 39/26* (2006.01)
  *B29K 23/00* (2006.01)
  *B29K 25/00* (2006.01)
  *B29K 27/06* (2006.01)
  *B29K 33/00* (2006.01)
  *B29K 29/00* (2006.01)
  *B29K 55/02* (2006.01)
  *B29K 75/00* (2006.01)
  *B29K 67/00* (2006.01)

(52) U.S. Cl.
  CPC ............... *B29K 2023/065* (2013.01); *B29K 2023/0625* (2013.01); *B29K 2023/0633* (2013.01); *B29K 2023/12* (2013.01); *B29K 2023/16* (2013.01); *B29K 2025/06* (2013.01); *B29K 2027/06* (2013.01); *B29K 2029/14* (2013.01); *B29K 2033/12* (2013.01); *B29K 2055/02* (2013.01); *B29K 2067/003* (2013.01); *B29K 2075/00* (2013.01)

(56) References Cited

OTHER PUBLICATIONS

Nam K. H. et al., "Patterning by Controlled Cracking", Nature 11002, May 10, 2012, vol. 485, pp. 221-224.
Kotz F. et al., "Three-Dimensional Printing of Transparent Fused Silica Glass", Nature 22061, Apr. 20, 2017, vol. 544, pp. 337-339.
Jang J. H. et al., "3D Micro - and Nanostructures via Interference Lithography", Advanced Functional Materials, Nov. 2007, vol. 17, Issue 16, pp. 3027-3041.
LaFratta C. N. et al., "Soft-Lithographic Replication of 3D Microstructures with Closed Loops", PNAS, Jun. 6, 2006, vol. 103, No. 23, pp. 8589-8594.
Glick C. C. et al., "Fabrication of Double-Sided Microfluidic Structures via 3d Printed Transfer Molding" DOI: 10.31438/trf.hh2016.43, Conference: 2016 Solid-State, Actuators, and Microsystems Workshop.

* cited by examiner (i) Constant $h$ and $W_{max}$, variable $W_{min}$ (ii) Constant $W_{min}$ and $W_{max}$, variable $h$

CRACK ENGINEERING AS A NEW ROUTE FOR THE CONSTRUCTION OF ARBITRARY HIERARCHICAL ARCHITECTURES

FIELD OF THE INVENTION

The present invention relates to a fabrication of three-dimensional (3D) hierarchical structures. More particularly, it relates to a method of fabricating three-dimensional (3D) hierarchical structures by harnessing the configurable elastic crack engineering.

BACKGROUND OF THE INVENTION

Three-dimensional (3D) hierarchical structures are the fundamental elements of numerous biological surfaces that exhibit various fascinating functionalities useful for liquid and mass transport, energy conversion, signal transformation, and topological interaction, etc. In recent years, extensive efforts have been directed towards mimicking these natural inspirations for practical applications. While breakthroughs in bio-inspired engineering have created a wide range of structures that enable various fascinating functionalities, these achievements remain conceptual because of the daunting challenge in creating desired hierarchical structures at affordable cost, in large scale, and/or with desired material. Generally, pre-designed hierarchical structures can only be prototyped using expensive and sophisticated technologies (that is, the standard MEMS process and/or two-photon 3D printing technologies). These methods are limited by very low throughput and very high cost, and are applicable to only a few materials, e.g., Si and photoresist. As a result, the created rigid structures inevitably suffer from limited structural durability, flexibility, and optical transparency, not to mention the unaffordable cost, thereby preventing their broad real-life applications. Thus, it is imperative to develop an affordable and scalable strategy to facilely fabricate hierarchical structures and increase the materials diversity for smart interfacial materials.

SUMMARY OF THE INVENTION

Accordingly, the objective of this invention relates to three-dimensional (3D) hierarchical morphologies widely exist in natural and biomimetic materials, which impart preferential functions including liquid and mass transport, energy conversion, and signal transmission for various applications. While notable progress has been made in the design and manufacturing of various hierarchical materials, the state-of-the-art approaches suffer from limited materials selection, high costs, as well as low processing throughput. Herein, by harnessing the configurable elastic crack engineering—controlled formation and configuration of cracks in elastic materials—an effect normally avoided in various industrial processes, the inventors report the development of a facile and powerful technique that enables the faithful transfer of arbitrary hierarchical structures with broad material compatibility and structural and functional integrity.

In one aspect of the present invention, there is provided a method of fabricating and mass-producing a three-dimensional hierarchical structure. The method comprises a first phase and a second phase. The first phase includes using a three-dimensional hierarchical structure as a master structure; enclosing the master structure in an elastomer mold, where a Young's modulus of the elastomer mold is at least one order of magnitude lower than a Young's modulus of the master structure; removing the master structure from the elastomer mold, where one or more controlled cracks are formed in the elastomer mold along the direction of a vertical peeling force, and a cavity mold is formed with a shape of the master structure in the elastomer mold; and controlling the formation of the one or more controlled cracks in the elastomer mold by adjusting a curing temperature and a curing time of the elastomer mold, so that the one or more controlled cracks are formed at a locked region in the elastomer mold during the master structure removal. The second phase includes curing the elastomer mold at a temperature higher than the curing temperature during the first phase to enhance the stiffness, self-sealing and configurability of the elastomer mold; filling the cavity mold with a replica material and curing the replica material to fabricate a replica of the master structure; and removing the replica from the elastomer mold.

In one embodiment of the present invention, the three-dimensional hierarchical structure comprises a closed-loop structure, a doubly reentrant structure, an arch, a high aspect ratio rod, a high aspect ratio two-cycle helix, or a 3D array.

In one embodiment of the present invention, the elastomer mold has a cracking coefficient η of at least 100% and a deformation coefficient φ during the first phase, and 1/Φ is equal to or greater than ε, and ε is the ultimate elongation at break of the elastomer mold.

In one embodiment of the present invention, the cracking coefficient is computed by:

$$\eta = W_{min}/h,$$

where $W_{min}$ is the smallest width of a neck region; h is the height of the locked region, and 2 μm<h<15 μm.

In one embodiment of the present invention, the deformation coefficient is computed by:

$$\varphi = W_{min}/W_{max},$$

where $W_{min}$ is the smallest width of a neck region; $W_{max}$ is the largest width near the locked region.

In one embodiment of the present invention, the elastomer mold has a local stress lower than a failure strength of the elastomer mold during fabricating.

In one embodiment of the present invention, the replica material comprises a base material or an engineering material.

In one embodiment of the present invention, the base material comprises silicon and a photoresist.

In one embodiment of the present invention, the engineering material comprises a polymer or a printable material.

In one embodiment of the present invention, the printable material comprises $SiO_2$, a metal, or a ceramic.

In one embodiment of the present invention, the polymer comprises a UV curable resin, a thermoset, a thermoset metal, and a thermoplastic.

In one embodiment of the present invention, the thermoplastic comprises low-density polyethylene (LDPE), linear low-density polyethylene (LLDPE), high-density polyethylene (HDPE), polypropylene (PP), polystyrene (PS), fluorinated ethylene propylene (FEP), perfluoroalkoxy alkane (PFA), polyvinyl acetate (PVA), Poly(methyl methacrylate) (PMMA), polyurethan (PU), polycarbonate (PC), Polyvinyl Chloride (PVC), polyethylene terephthalate (PET) and acrylonitrile butadiene styrene copolymers (ABS).

In one embodiment of the present invention, the elastomer mold comprises polydimethylsiloxane (PDMS) polymer.

In one embodiment of the present invention, the curing temperature and the curing time of the elastomer mold during the first phase is at 22 to 25° C. for 24 hours.

In one embodiment of the present invention, the elastomer mold is cured by baking at 150° C. for 30 minutes during the second phase, and the temperature gradually rises from room temperature at a rate of 10° C. per minute during the baking process.

In one embodiment of the present invention, the elastomer mold is cured by baking at 250° C. for 1 hour during the second phase, and the temperature gradually rises from room temperature at a rate of 10° C. per minute during the baking process.

Those skilled in the art will appreciate that the invention described herein is susceptible to variations and modifications other than those specifically described.

The invention includes all such variation and modifications. The invention also includes all the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF THE DRAWINGS

The above and other objects and features of the present invention will become apparent from the following description of the invention, when taken in conjunction with the accompanying drawings, in which.

DETAILED DESCRIPTION OF THE INVENTION

Figure 1A:
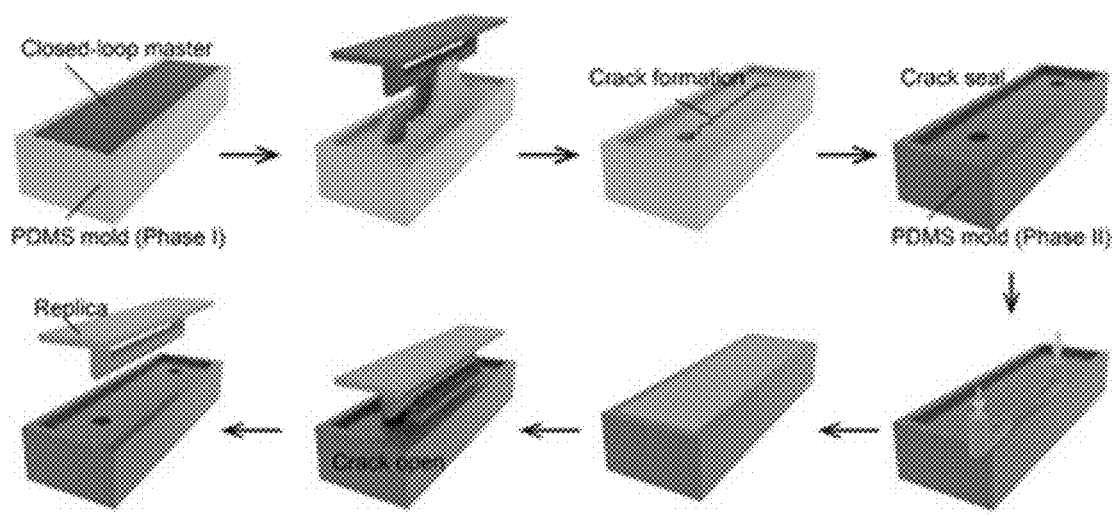
FIG. 1A shows the schematic illustration of CECE for molding closed-loop structures. The upper row shows the controlled formation of the elastic crack in PDMS (Phase I). The lower row shows the configurable seal/open of the crack in PDMS (Phase II). In Phase I, PDMS is prone to large elastic deformation and cracking; in Phase II, PDMS is relatively rigid and can keep the conformality.

In this invention, the inventors report an approach that enables mass-production of arbitrary hierarchical structures through a faithful replication process with broad material compatibility. In striking contrast to conventional wisdom, the inventors demonstrate that the previously strictly avoided detrimental crack phenomenon can be translated into a powerful tool to achieve structures and functions that are otherwise impossible to realize even using state-of-art facilities. The inventors' innovation lies in that elastomer materials are associated with a high level of configurability by virtue of their elastic deformation characteristics; effectively controlling the cracking in elastic materials and subsequently configuration of the elastic crack can pave a road for 3D replication. The inventors demonstrated that this approach can realize faithful mass-production of various functional hierarchical structures reported before that could only be made at very small scale in silicon or photoresist only. The inventors name this new approach configurable, elastic crack engineering (CECE)-assisted molding, which is a breakthrough in microfabrication technology, as it greatly extends the range of 3D micro-processible materials to broadly used structural plastics and other shapeable materials, as well as tremendously reduced the production cost (by the order of 10^4) and increased the production scope and throughput. The inventors' work paves the way for the cost-effective, large-scale production of a variety of flexible, inexpensive, and transparent 3D hierarchical and biomimetic materials.

Revealing New Elastic Material Physics

Whereas studies have shown that proper control of crack formation in rigid materials (e.g., hexagonal BN, SiN, Pt, and Si) can give rise to useful functionalities such as atomic-scale pattern formation, there generally lacks understanding whether the formation and configuration of cracks can be controlled in an elastomer, because their amorphous structure does not contain any preferred cracking direction and the cracking appears to be random and out of control. Based on systematic experiments and simulation, the inventors demonstrate that when the mechanical property of the elastomer is dynamically changed in a certain way, it is possible to control the formation and configuration of cracks in an elastomer, and use it as a mold to realize faithful replication of 3D hierarchical structures. The inventors investigated the mechanic and geometric effects on the crack formation and the critical forces to manipulate the elastic cracks, thus, providing general guides for the master design and the material options. With the full understanding of the physics of elastic cracks, the inventors have created novel functions in fabrication with previously strictly avoided cracking phenomenon. Notably, the replication of 3D hierarchical structures using configurable cracks has never been achieved previously.

Important New Functions of Structured Materials

Using the inventors' new approach CECE, the inventors constructed various flexible and transparent biomimetic materials, which could not be made using start-of-art technologies before, and proved their remarkable new functions compared to past reports. Notably, CECE expands the material choices from limited base materials (e.g., Si and photoresist) to a broad range of engineering materials (e.g., polymers, and other printable materials including SiO2, metal, ceramic, etc.), therefore, addresses the long-lasting challenge to bio-inspired engineering—the demand of a rational combination of hierarchical structures and base material to achieve diverse properties and functions. The capability of CECE using new materials to fabricate the pre-designed hierarchical structures opens up a broad way to enable new functions of the bio-inspired materials. The inventors demonstrated two impressive examples in the inventors' work. One example is a 3D hierarchical structured soft membrane mimicking the smart-skin patterns of springtails that show outstanding repellence to various liquids; different from previous reports, the inventors are able to make the structures on a flexible membrane with excellent mechanochemical robustness. Another example is the realization of flexible and anti-corrosion polymer-based liquid diodes decorated with capillary channels and mushroom structures on various plastics, even on curved surfaces, which could not be realized before due to the limitation in materials selection for conventional silicon processing. The inventors' work demonstrated the cost-effective, large-scale production of a variety of flexible, inexpensive, robust, and transparent 3D hierarchical and biomimetic materials, which was impossible to achieve before. In this way, CECE enables an unprecedented freedom in the material selection for making bio-inspired materials and the paves the road for transferring biomimetic materials into real-world applications.

Main Text

Three-dimensional (3D) hierarchical structures are the fundamental elements of numerous biological and artificial surfaces that exhibit various fascinating functionalities useful for liquid and mass transport, adhesion, signal transformation, and structural coloration, etc. For instance, many living organisms evolved exquisite structures and functional materials for surviving in harsh environments. One extreme case is the evolution of reentrant structures that show superior repellence to liquids even with ultralow surface tension. The manifestation of these special architecture enables the skin of springtail beetles to repel various liquids and dirt, and respire in humid and dirty environment. Another extreme case is exemplified by *Nepenthes alata* that evolved peristome arrays to offer the spontaneous, diode-like spreading of liquid. The diversity and complexity of structures result in many unexpected combinations of functions, allowing biological systems to survive and adapt to the challenges of life.

In recent years, extensive efforts have been directed towards reproduction of these representative architectures, which is of importance to the creation of a wide spectrum of biomimetic and smart materials for practical applications. While breakthroughs in bio-inspired engineering have achieved a wide range of structures that enable various fascinating functionalities, it remains a daunting challenge to mimic structural hierarchy, material diversity, and functional sophistication of living organisms in a facile and reproducible manner. So far, these exquisite morphologies are generally achieved on rigid materials such as polystyrene (PS) and silicon using expensive and sophisticated microfabrication technologies and/or two-photon 3D printing technologies. More importantly, these rigid engineered structures are mechanically vulnerable to external load because of the concentration of high local stress during their deformation, chemically susceptible to corrosives, topologically limited, and optically less attractive, thereby preventing real-life applications. Thus, it is timely to develop affordable and scalable strategies that enable the attainment of structural and functional diversity on more diversified materials.

In the manufacturing of various hierarchical structures, the formation of cracks has normally been avoided due to its detrimental nature. For example, in one of the most commonly used fabrication processes, replication, the inevitable formation of uncontrolled cracks and subsequent structural failure, as a result of the presence of deadlocking region in the transfer of hierarchical structures. Previous studies have also shown that proper control of crack formation in rigid materials (e.g., hexagonal BN, SiN, Pt, and Si) can give rise to useful functionalities such as atomic-scale pattern formation. Inspired by these studies, the inventors hypothesize that the controllable formation and configurability of cracks in elastic materials might be utilized to achieve more diverse structures and functions otherwise impossible to realize using state-of-art facilities. Herein, the inventor develop a new technique, termed as configurable, elastic crack engineering (CECE)-assisted molding, which transforms the detrimental crack effect into a powerful tool for the cost-effective, large-scale fabrication of various hierarchical structures on a wide range of materials. As an immediate implementation, the inventors develop new super-repellant surfaces and liquid diode devices with unprecedented functionalities.

The inventors' work mainly resorts to the unique features of elastomer materials, i.e., superior elastic deformation and a high level of configurability. Elastomers are usually amorphous, and thus tend to randomly crack when subject to stress during the replication process. To suppress the random cracks, the inventors develop a modified soft lithography process (FIG. 1A) that enables the formation of a configurable intermediate state during the casting process. The elastomer material in such an intermediate state fulfills two requirements simultaneously. On one hand, it is soft enough to bear a large elastic deformation and can spontaneously develop cracks at the preferential location to allow easy peeling from any master structure. On the other hand, it is rigid enough to regain its original shape for the reliable creation of final structures.

Figure 1B:
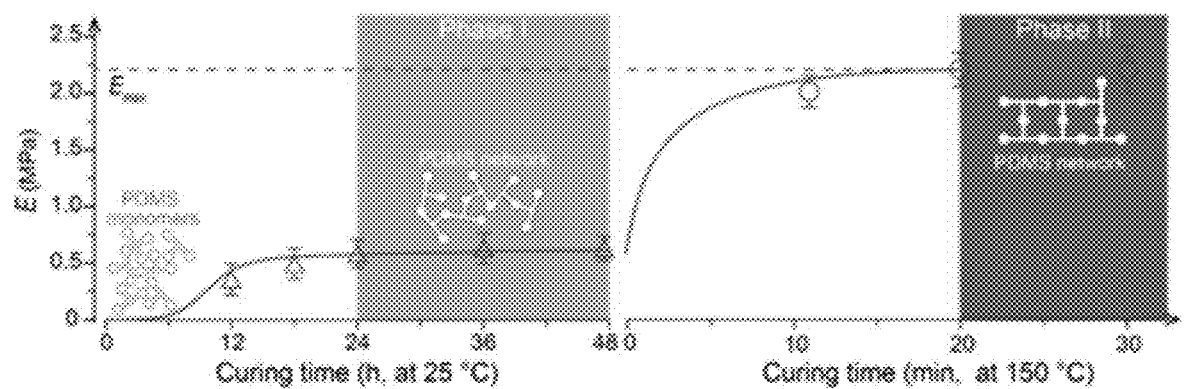
FIG. 1B shows molecular-level mechanism of dynamical manipulation of the mechanics of PDMS (Phase I and II) by adjusting the curing temperature and curing time. The dashed line denotes maximum E of PDMS when fully cured at high temperature. Note that temperature plays the dominating role, leaving wide time windows for operation.
Figure 1C:
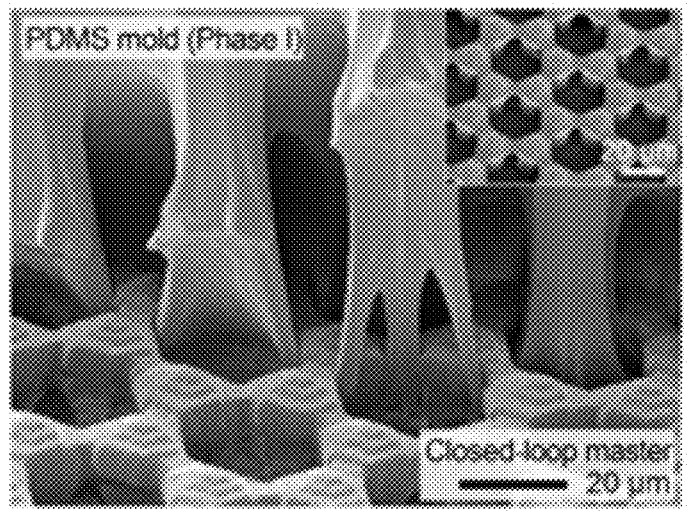
FIG. 1C shows SEM images of the elastic crack formation in PDMS (Phase I) being pulled out from an array of closed loops with diverse directions which is showed in the inset.
Figure 1D:
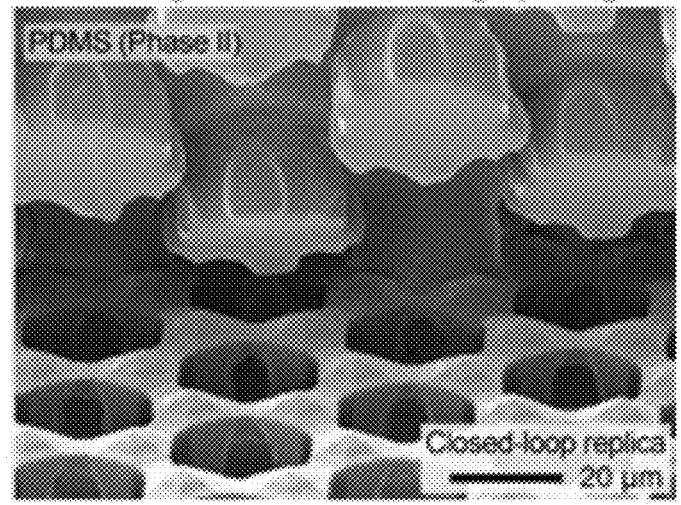
FIG. 1D shows SEM image showing the process of separating PDMS (Phase II) from the closed-loop replica. The elastic crack self-sealed during molding and intact closed-loop replicas were obtained.
Figure 1E:
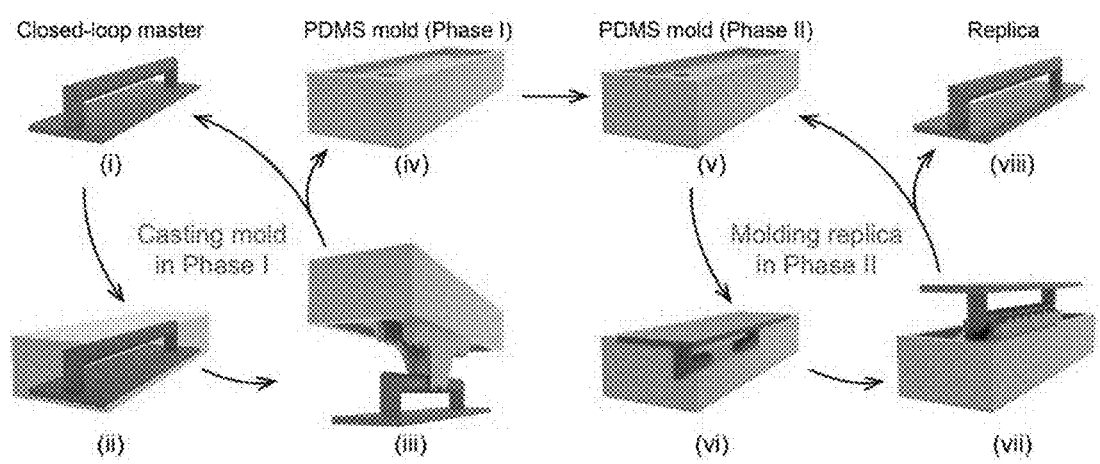
FIG. 1E shows the schematic illustration of CECE for molding closed-loop structures. The parts i to iv show the controlled formation of the elastic crack in PDMS (Phase I). The parts v to viii show the configurable seal/open of the crack in PDMS (Phase II). In Phase I, PDMS is prone to large elastic deformation and cracking; in Phase II, PDMS is relatively rigid and can keep the conformality.

FIG. 1A and FIG. 1E schematically illustrate the principle of CECE, in which a closed-loop structure is used as a master (FIG. 1A and FIG. 1E). Distinct from existing methods, CECE is a two-phase process (FIG. 1A and FIG. 1E) characterized by two curing stages of the elastomer (FIG. 1B and FIG. 5). The images in the upper row of FIG. 1A present the spontaneous formation of a crack in the elastomer in Phase I when the closed loop is peeled off during the preparation of the polydimethylsiloxane (PDMS) mold of the master structure. The elastomer is cured at low temperature to give rise to a relatively lower density of crosslinking and looser macromolecular packing. The Young's modulus of as-prepared elastomer is more than one order of magnitude lower than that of the closed-loop master microstructure, and at least lower than the latter, which ensures that cracks are developed in the elastomer rather than in the master. During the peeling-off process, cracks are generated along the direction of the vertical peeling force. Since the subsequent molding process involves relatively high pressure, the elastomer mold needs to be self-sealable. Thus, to translate the intermediate elastomer into a mature mold for the creation of 3D structure, an additional curing step at higher temperatures, denoted as Phase II, to enhance the stiffness, self-sealing, and configurability of the elastomer is provided. In this way, the crack keeps self-sealing during molding and regains its original shape after this entire process, and the shape and size of the as-formed elastic crack can be dynamically manipulated in Phase II, where a molding process is used to create a replica of the master. On the other hand, Phase I is proven necessary, as without it cracks are randomly formed without the preferred configurability, which is similar to the case of conventional soft lithography process.

Figure 5A:
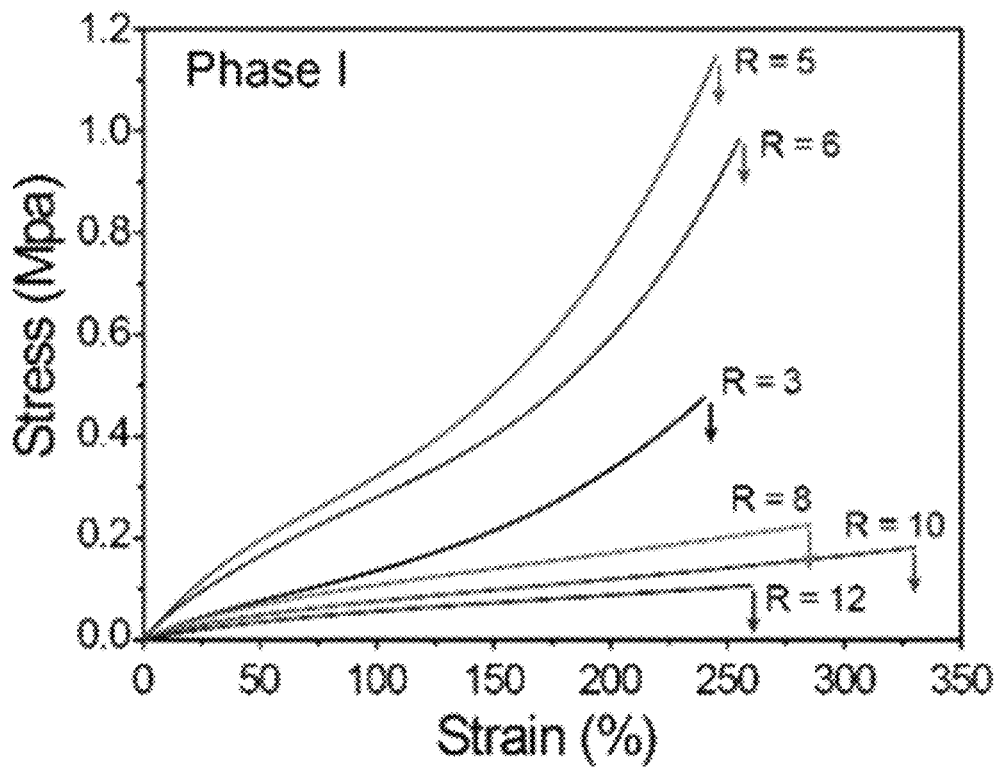
FIG. 5A shows the mechanical property of PDMS produced with different mixing ratios and different curing levels when the tensile stress-strain behavior of PDMS cured at room temperature for 12 h.
Figure 5B:
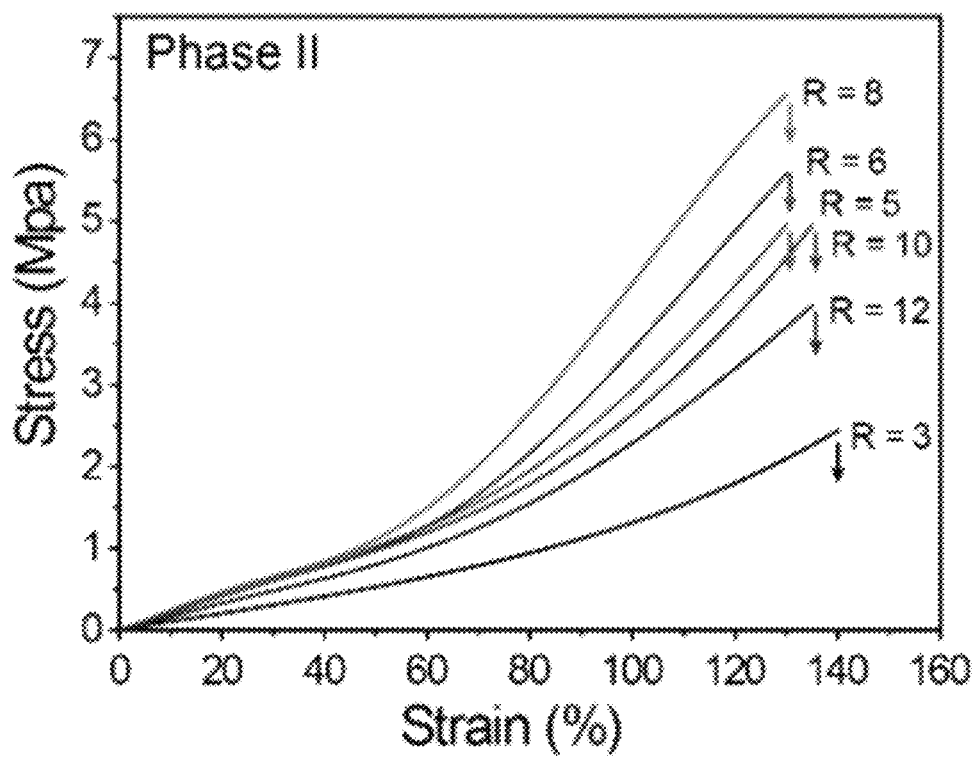
FIG. 5B shows the mechanical property of PDMS produced with different mixing ratios and different curing levels when the tensile stress-strain behavior of PDMS cured at 25° C. for 12 h and then baked at 150° C. for 30 min. The samples were prepared using a customized dumbbell mold (the narrow region is 5-mm wide and 2-mm thick). The separation rate during the tests was 500 mm/min. The strain at which fracture occurred (indicated by arrows) is defined as the elongation at break.
Figure 5C:
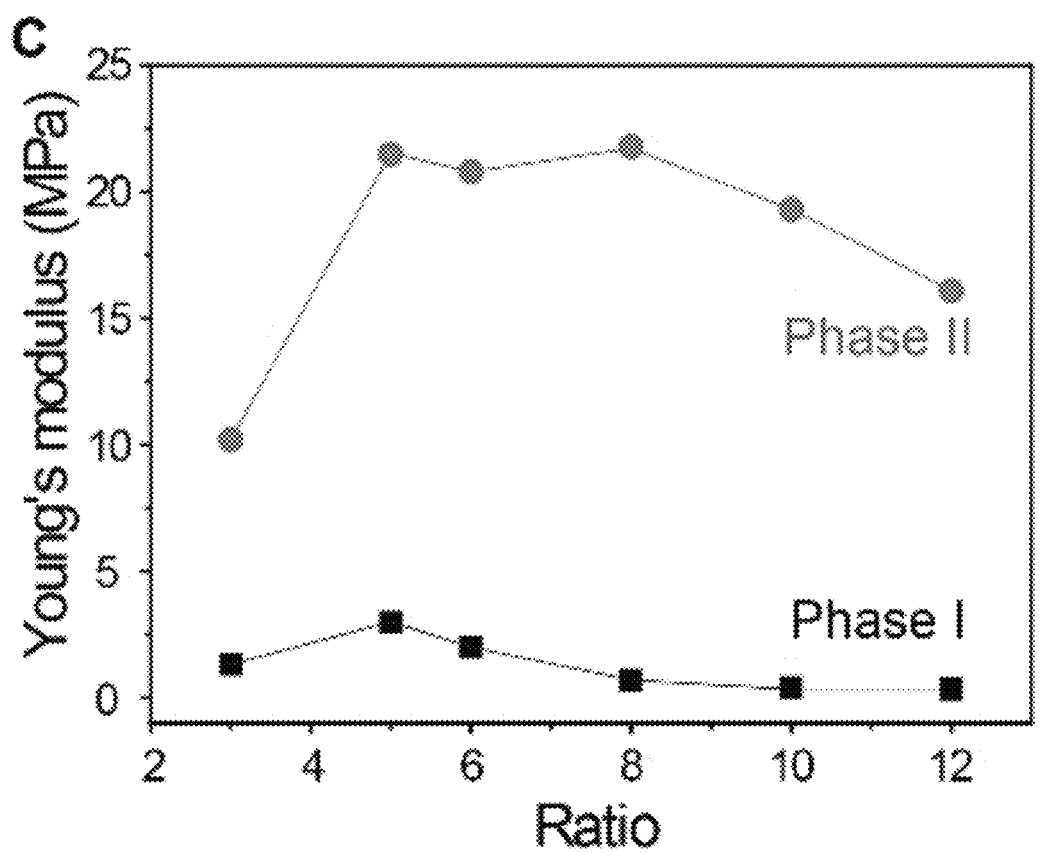
FIG. 5C shows Young's modulus of the PDMS with various mixing ratios of Part A (prepolymer) to Part B (crosslinker) in Phase I and II.
Figure 6A:
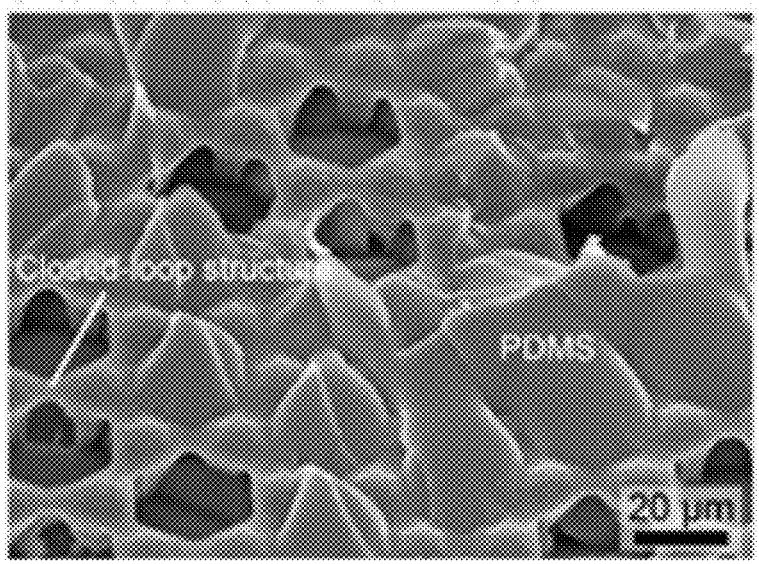
FIG. 6A shows failure cases of true 3D molding resulted from the inobservance of CECE principle where the elastic cracks were totally out of control during casting when the PDMS was directly enhanced to Phase II.
Figure 6B:
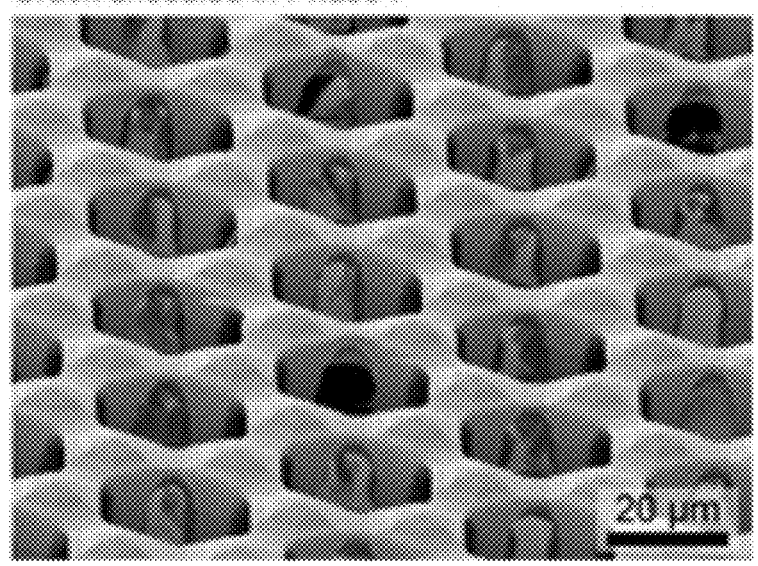
FIG. 6B shows failure cases of true 3D molding resulted from the inobservance of CECE principle where thin membranes were observed in the otherwise closed loops replicated from PDMS mold in Phase I during molding, suggesting the unsealed elastic cracks without introducing Phase II.

To demonstrate the utility of CECE, a master containing an array of closed-loop structures is provided. After the fabrication using two-photon absorption (TPA, FIG. 6A-6B), PDMS is cast into the master (FIG. 1E) to create a soft mold. PDMS was chosen because its curing dynamics can be easily controlled by adjusting the curing temperature and time (FIG. 1B and FIG. 5). The polymerization and curing are carefully controlled to induce the crack formation at locked regions in the soft mold during peeling from the closed-loop master. As demonstrated in the SEM images (FIG. 1C), the prepared PDMS in Phase I bears a large deformation and can be completely released from the closed-loop structure. In contrast, as shown in FIG. 6A, without the introduction of Phase I, the cracking was randomly formed in PDMS and both master and PDMS mold were damaged during the casting process. Moreover, the crack formed in Phase I can be spontaneously opened (FIG. 1D) in Phase II, making it possible to create many replicas based on one mold. On the other hand, without the introduction of Phase II the crack formed in Phase I is not stiff enough to self-seal; as shown in FIG. 6B, thin membranes are observed in the replica and blocks the hole of the loop during molding. Taken together, these experiments suggest that the principle of CECE is essential for the successful creation of hierarchical structures.

Figure 2A:
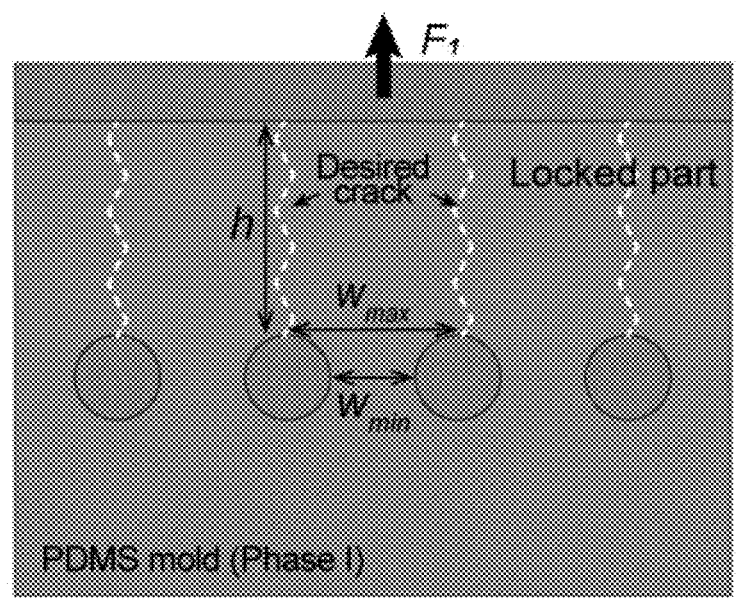
FIG. 2A shows a study of the controlled formation of elastic cracks in Phase I. A 2D model is simplified from the cross-sectional view of the closed-loop array for studying the crack formation process. Controlled crack formation takes place along the direction of the peeling force F; failure occurs when crack forms along the interface (referred to as neck region) of the locked part.
Figure 2B:
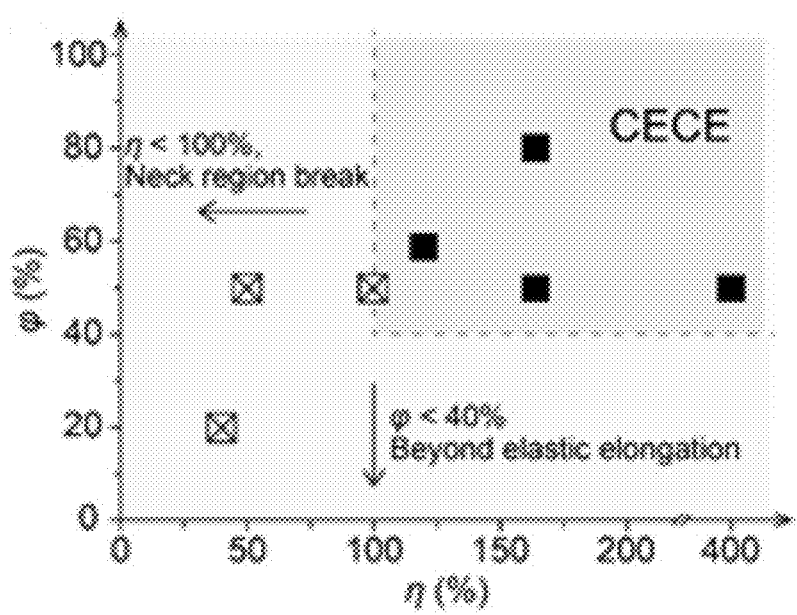
FIG. 2B shows a study of the controlled formation of elastic cracks in Phase I. A diagram predicting the controlled crack formation. The experimental and simulation results for the geometries are provided in FIG. 8A and FIG. 8B.
Figure 8A:
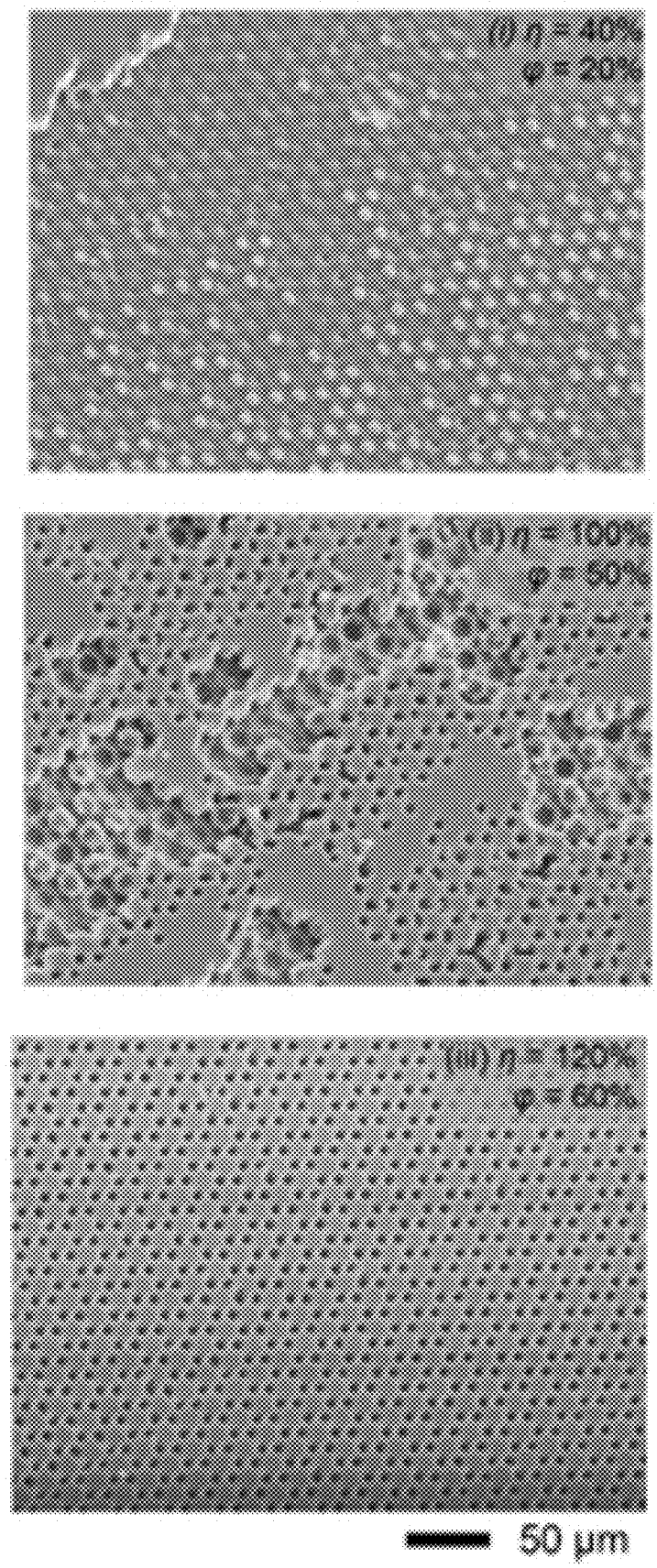
FIG. 8A shows experiments results for selected geometries covered in the prediction map in FIG. 2B.
Figure 8B:
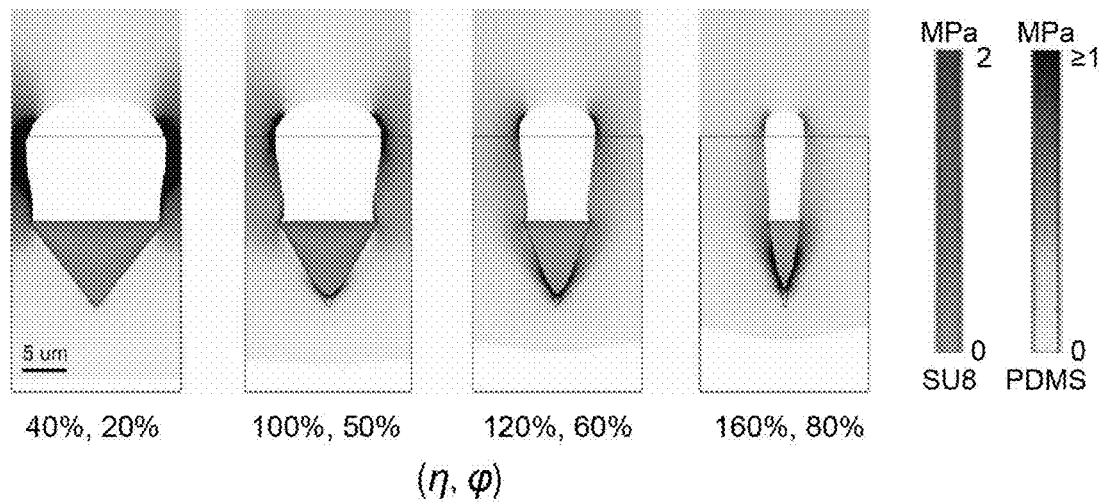
FIG. 8B shows simulation results for selected geometries covered in the prediction map in FIG. 2B.
Figure 8B:
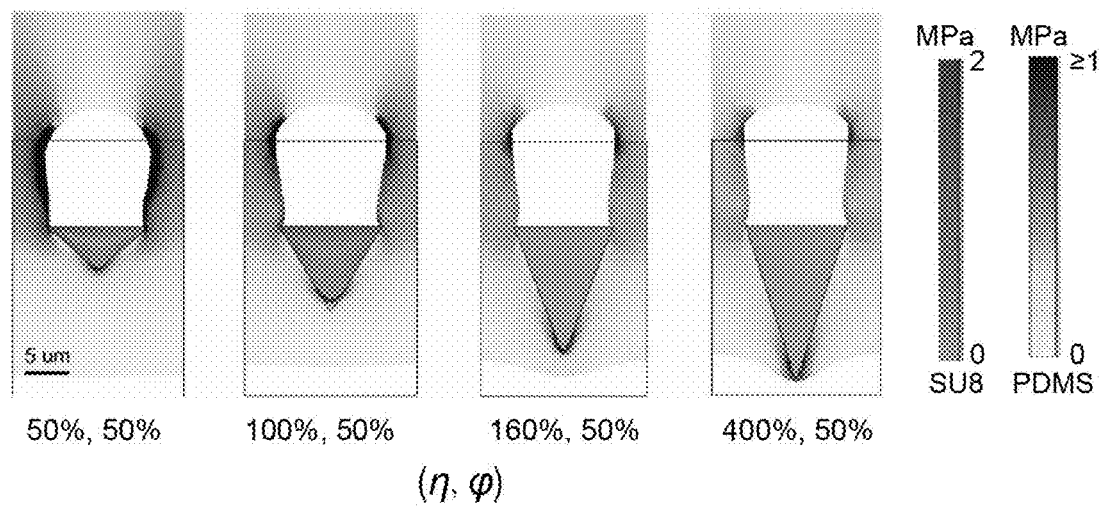

The controlled formation of crack for CECE should meet two criteria: (1) the crack should be preferentially formed in the PDMS mold rather than in the master. Moreover, the crack should develop along the direction of vertical peeling force; (2) the PDMS mold should be able to elastically deform and can be released completely from the closed-loop master. To provide a fundamental guidance for successful 3D replication, the reproducible formation and configuration of the cracks in both Phase I and II of CECE are studied. In Phase I, the geometry of the master determines the stress distribution in the PDMS, and thereby the eventual location and direction of cracking. To study how the geometric features of masters affect the crack formation, a simple analytical model is provided. As shown in FIG. 2A, a cracking coefficient $\eta=W_{min}/h$ is defined to predict the location of the cracking, where $W_{min}$ is the smallest width of the neck region and h is the height of the locked part. Similarly, to quantify the required maximum deformation of PDMS elastomer for its complete release from the master, it is denoted a deformation coefficient $\varphi=W_{min}/W_{max}$, where $W_{max}$ is the largest width near the locked region. To provide guidance for the rational design of proper master structures, a phase diagram showing the effect of geometric parameters on the crack formation behavior is mapped out (FIG. 2B). The CECE will fail under the following two conditions. (1) when $\eta<100\%$, the neck region breaks before the desired cracking emerges along the direction of peeling force; (2) when $1/\varphi<\varepsilon$ (where $\varepsilon$ is the ultimate elongation of elastomer at break, e=250% for PDMS), the deformation of PDMS goes beyond its limit and as a result the mold cannot be released during the separation process. To validate the present model, a series of PDMS molds were fabricated based on closed-loop masters with various geometries $\eta$ and $\varphi$. Notably, the cracking behaviors observed in the present invention are consistent with the prediction shown in the phase diagram (FIG. 8A, FIG. 2B). A finite element analysis (FEA) is also performed to further reveal the stress distribution in PDMS molds (FIG. 8B). Indeed, an increase in either r or p leads to both stronger stress and higher local deformation near the neck layer; otherwise, the stress distribution and the deformation shift to the bottom layer.

Figure 2C:
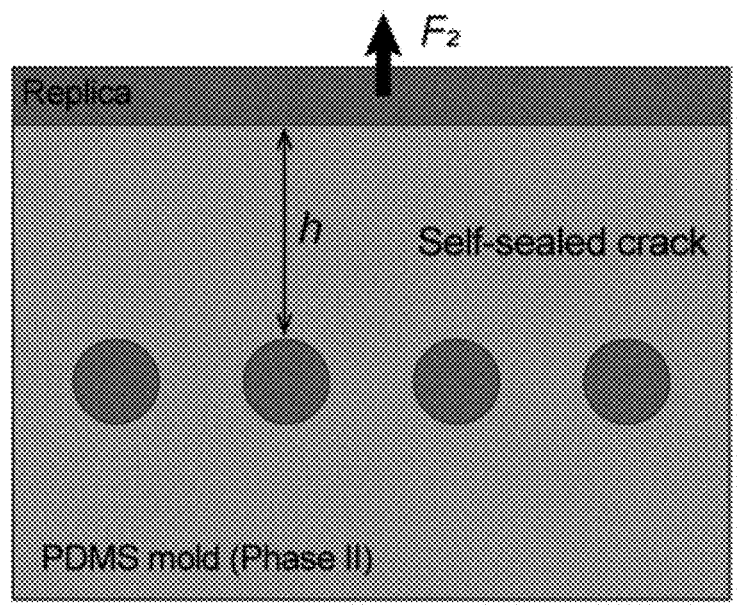
FIG. 2C shows a study of configurable seal/open of the elastic cracks in Phase II. A geometric illustration showing the test of the configurability. The product loop is pulled out from the self-sealed elastic crack, and the yield point of the loop is checked.
Figure 2D:
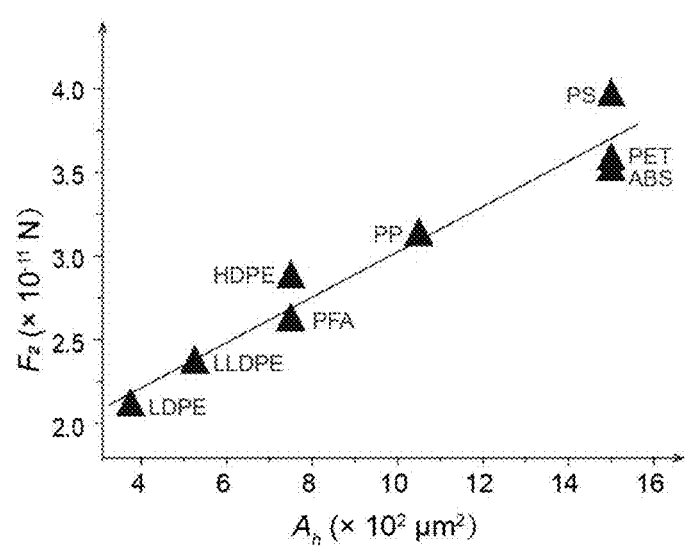
FIG. 2D shows a study of configurable seal/open of the elastic cracks in Phase II. The relationship between the critical force $F_2$ to open the cracks and the interfacial area $A_h$ of the crack. The full names for the abbreviations of polymers are provided in the Material and Method section.
Figure 9A:
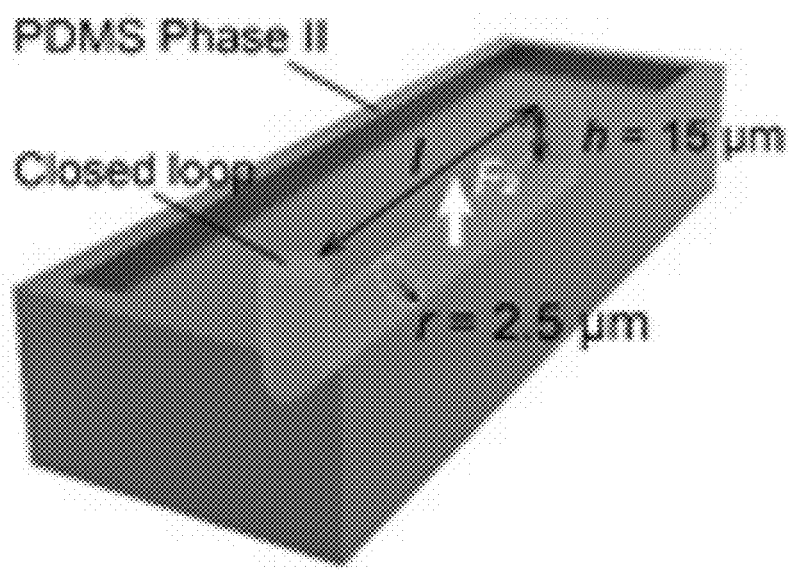
FIG. 9A shows the self-adaptivity of elastic crack for configurable seal/open. The illustration of the three-dimensional model for studying the critical force $F_2$ to open the elastic crack with given interfacial area.
Figure 9B:
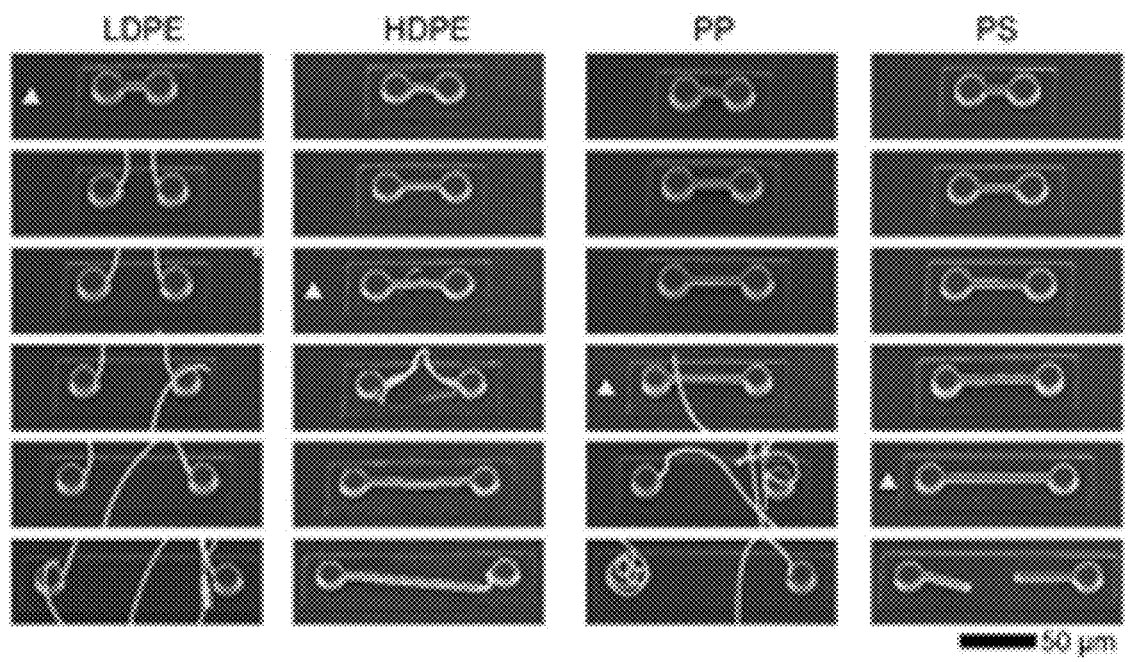
FIG. 9B shows the self-adaptivity of elastic crack for configurable seal/open. The representative molding results by using polymeric materials with different flexural modulus. The triangles denote the closed loops at the yield point.

Based on a simple 2D model, it is continued to evaluate the configurability of a sealed crack with a given interfacial area ($A_h$) by characterizing the required critical force ($F_2$) to open it (FIG. 2C). A 3D geometric illustration is also provided in FIG. 9A. Briefly, a soft mold was created from a master containing a set of closed-loop structures with fixed height h=15 μm, and different lengths l. Thus, the interfacial area of the crack can be expressed as $A_h$=hl. The mold was used to create replicas made of materials with various flexural strengths ($\sigma$). It is imaginable that in the demolding process the replica material has to be stiff enough to endure the drag during releasing through a crack in the mold. The replica loop structure with low $\sigma$ and large l were observed to be misshaped because of the drag during releasing from the mold through the cracks. Thus, the maximum length of the faithful replicas was measured and recorded as the yield point of the material with specific a (FIG. 9B). At the yield point, the critical force can be expressed as $F_2=\pi\sigma r^3/l$, where is the flexural strength of the replica material, and r is the radius of the closed loops (r=2.5 μm). The critical force $F_2$ is found to be proportional to $A_h$, (that is, $\pi\sigma r^3/l\sim hl$) as plotted in FIG. 2D, indicating a good configurability of the sealing/opening of the elastic crack. Thus, for a given elastic crack, the required minimum flexural strength of the replica material can be calculated through $\sigma \cdot hl^2/\pi r^3$ for guiding the material option. The present invention suggests a lower local stress in the PDMS mold than the failure strength of PDMS during molding (FIG. 10), making the reversible sealing and opening possible without damaging either the mold or the replicas. The failure strength of PDMS during molding is in a range of 2-6 MPa.

Figure 3A:
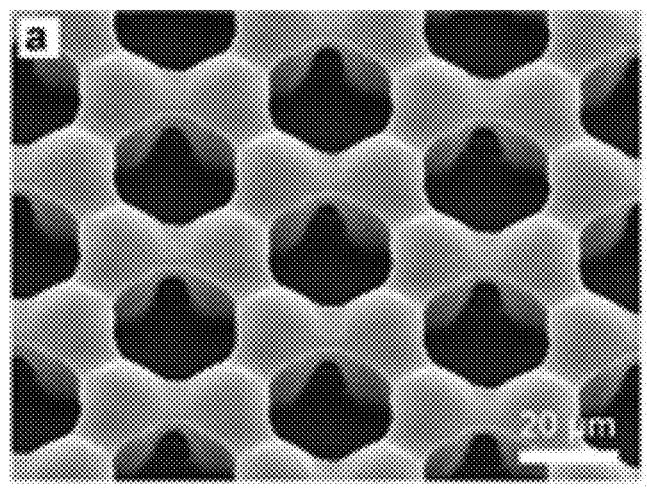
FIG. 3A shows SEM images of the master structures of a close-loop array with hexagon lattice.
Figure 3B:
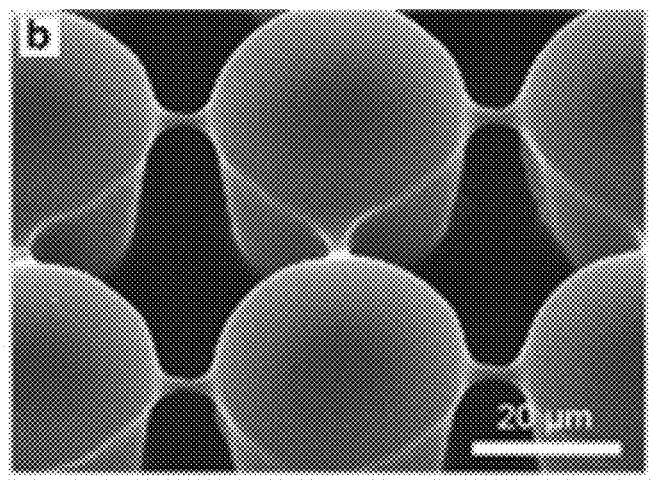
FIG. 3B shows SEM images of the master structure of a close-loop array with square lattice.
Figure 3C:
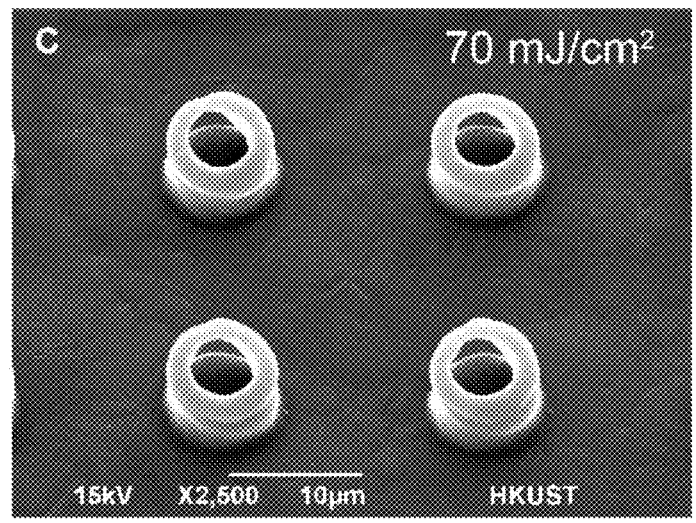
FIG. 3C shows SEM images of the master structure of an array of split rings.
Figure 3D:
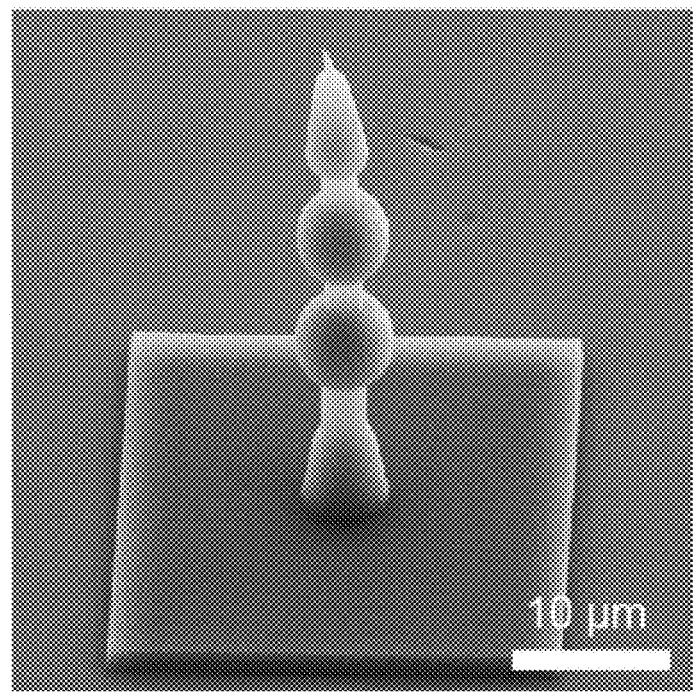
FIG. 3D shows SEM images of the master structure of a beaded probe.
Figure 3E:
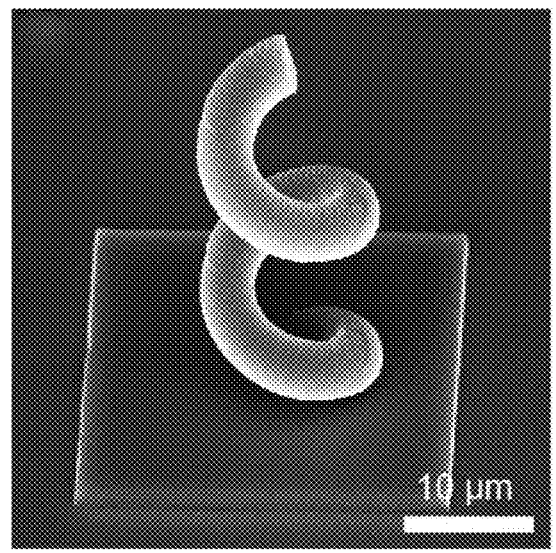
FIG. 3E shows SEM images of the master structure of a helix.
Figure 3F:
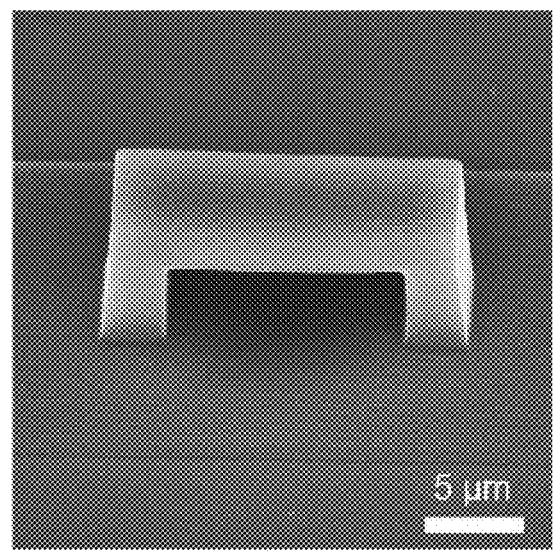
FIG. 3F shows SEM images of the master structure of an arch.
Figure 3G:
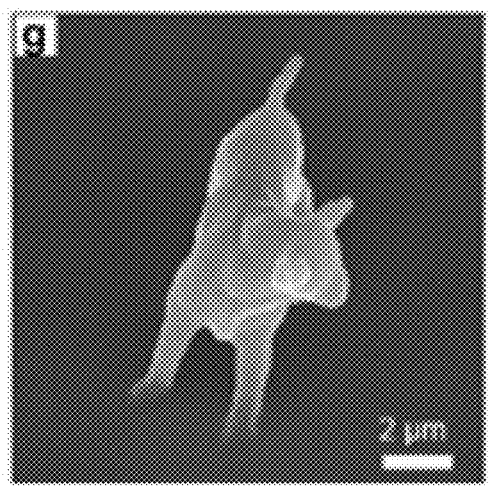
FIG. 3G shows SEM images of the master structure of a bull.

To thoroughly evaluate the performance and merits of CECE, a variety of representative 3D hierarchical structures were further replicated (i.e., a beaded probe, a helix, an arch, a multi-beam, a split-ring, and a bull), resembling those emerging architectures with promising functions. The masters of these structures (FIG. 3B-3G) were fabricated using prototyping methods that are expensive, time-consuming, and low throughput. These 3D hierarchical structure structures have been proven challenging for replication using existing methods, owing to the presence of multiple pronged nanoscale shapes (i.e., closed loop, reentrant, high-aspect-ratio rods, and 3D arrays). For the doubly beaded probe shown in FIG. 3A, an aspect ratio (height/width) of 20 was achieved, which has surpassed most of the previous works. a more complicated two-cycle helix structure with high aspect ratio (FIG. 3B) was also successfully replicated. This result nicely demonstrated the remarkable configurability of CECE via elastic deformation. To assess the lifespan of the elastic crack, one PDMS mold was used to repeatedly replicate an arch structure for cycles (FIG. 3C). Notably, the structure obtained after $50^{th}$ cycles is still exactly identical with the master (FIG. 11A-11D), demonstrating the superior robustness of the present invention. As shown in FIGS. 3D and 3E, with CECE to the present invention enables creation of structures with nanoscale beams and gaps, even down to 280 nm and 80 nm, respectively. Finally, a microbull (FIG.

Figure 4A:
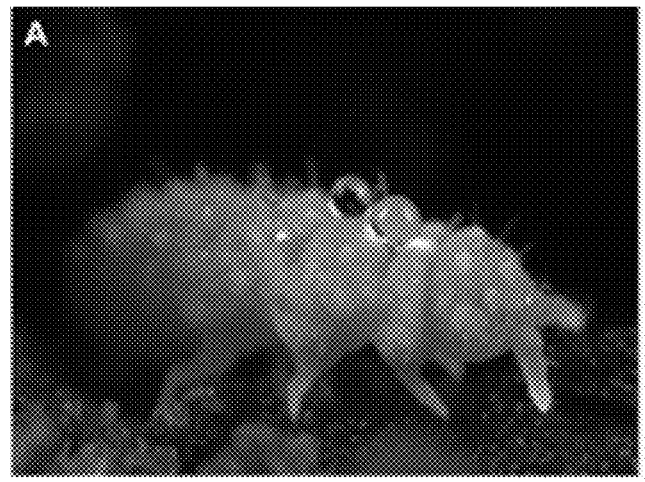
FIG. 4A shows the biomimetic materials construction. A flexible and superomniphobic surface with doubly reentrant arrays mimicking the skin of springtail. An optical image of a springtail with water droplets sitting on its skin.
Figure 4B:
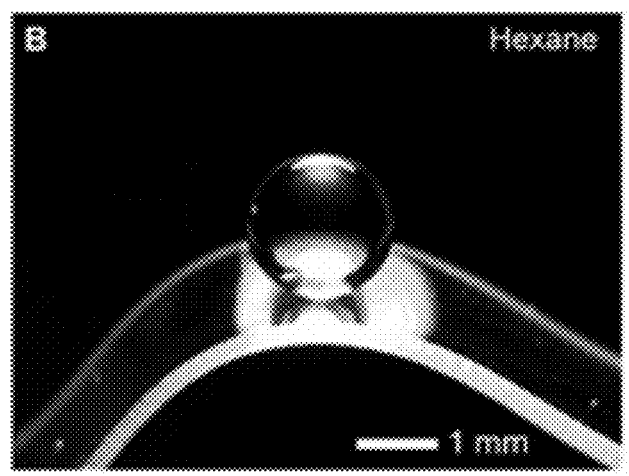
FIG. 4B shows the biomimetic materials construction. An optical image of a blue dyed hexane droplet sitting on the transparent and superomniphobic surface.
Figure 4C:
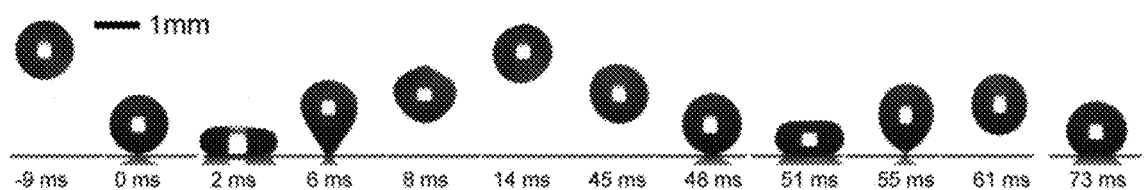
FIG. 4C shows the biomimetic materials construction. Time-lapse photographs showing a hexane droplet bouncing on the superomniphobic surface.
Figure 4D:
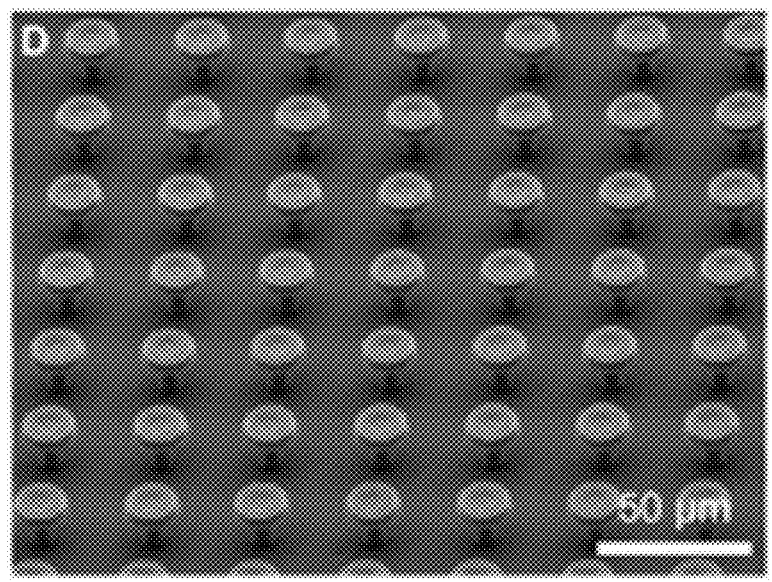
FIG. 4D shows the biomimetic materials construction. SEM image of the superomniphobic surface with an array of doubly reentrant structures.
Figure 4E:
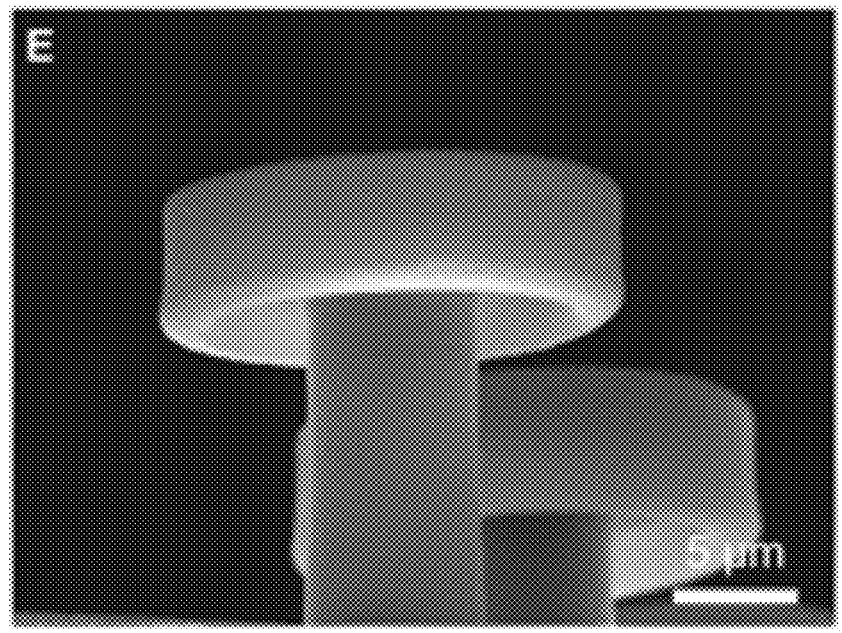
FIG. 4E shows the biomimetic materials construction. Zoom-in image of the doubly reentrant structure.
Figure 4F:
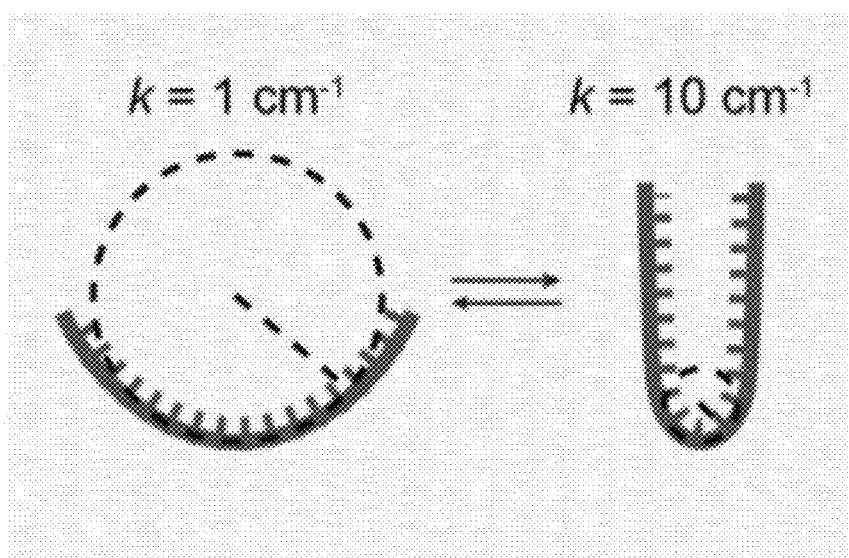
FIG. 4F shows the geometric illustration of the buckling model for the robustness test, where k is the curvature of the bent surface.

3F), representing the most complicated arbitrary 3D structures producible using state-of-art techniques, can also be faithfully replicated, revealing the unprecedented capability of CECE and its full compatibility to initial prototyping techniques. Table 1 summarizes a detailed comparison of characteristics between CECE and other fabrication methods. Taken together, it is clear that CECE is a unique technique for efficient and scalable replication of any 3D microstructures.

magnitude lower than those of standard 3D prototyping methods. Remarkably, owing to its strong flexibility and elastic deformation, these doubly reentrant structures preserve their structural integrity and liquid repellence during repeated bending deformation. The bending test was conducted by using a buckling device with defined curvatures (k, as illustrated in FIG. 4F) at a frequency of 50 cycles per minute. For water and ultralow-surface tension liquids (e.g., ethanol and hexane), no obvious decay in the dynamic

TABLE 1

Comparison between CECE and other 3D prototyping/replication methods.

| Method | Resolution | fabrication style | Compatible structure | Processible material | comments |
|---|---|---|---|---|---|
| 3D printing (i.e., TAP) | 40 nm-50 μm | Point-by-point scanning | True 3D structures | Photoresists; thermoplastics; metals; ceramics; etc. (Specific to printing style) | Serial processing; low speed; high cost |
| Interference lithography | 150 nm | Interference beam projection | Quasi 3D structures with certain specific geometries only | Photoresists | Serial processing; low speed; high cost; complicated process |
| X-ray lithography | 50 nm | X-ray projection | Quasi 3D structures | Photoresists | Serial processing; low speed; high cost; complicated process |
| Focused electro/ion beam deposition | 80 nm | Chemical vapor deposition induced by electron/ion beam scan | True 3D structures | Metal; SiO$_2$ | Serial processing; extremely low speed; extremely high cost; complicated process |
| Conventional Soft lithography | 2 μm | Replica molding | Quasi 3D structures; fail in direct replication of true 3D structure; | UV curable resins; Thermosets; Thermoplastics; | Applicable to only specially engineered true 3D structures with the large sacrifice of conformality; parallel processing; high speed; low cost |
| CECE | 80 nm | Elastic crack-assisted replica molding | True 3D structure | Thermoplastics; UV curable resins; thermosets metals; ceramics; etc. | Direct replication of true 3D structures; parallel processing; high speed; low cost |

Figure 4G:
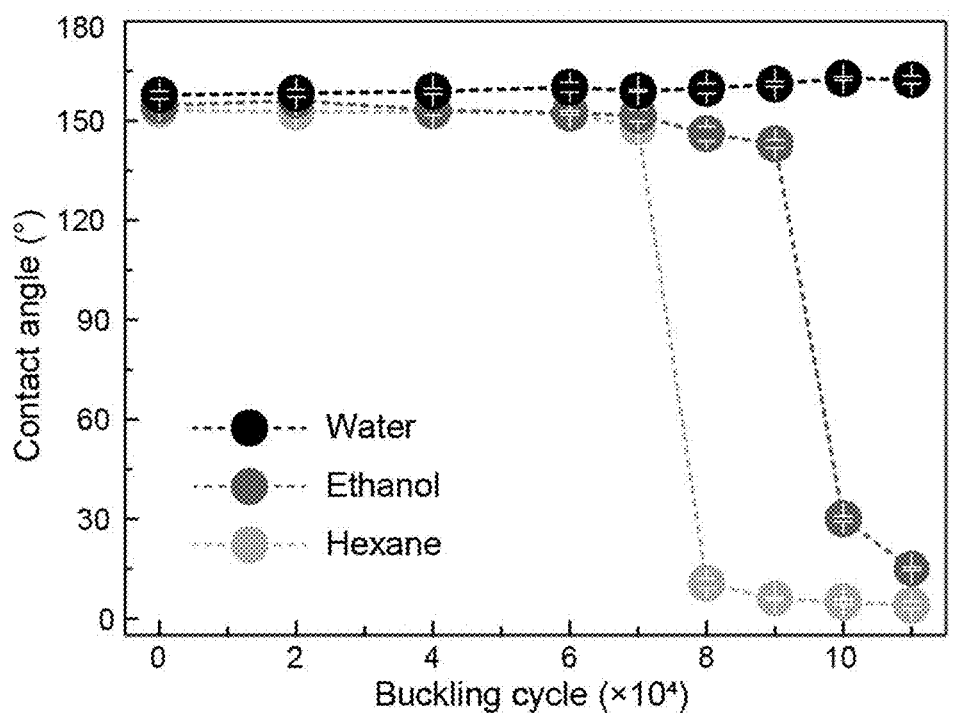
FIG. 4G shows the evolution of contact angles of water, ethanol, and hexane on the superomniphobic along with the buckling cycles.

With the aid of CECE, the present invention enables constructing virtually any 3D hierarchical structures to impart preferred functions. An artificial superomniphobic surface was first reproduced to mimic the soft, semitransparent, and liquid-repellent springtail skin (FIG. 4A). FIG. 4B shows the optical image of the as-fabricated, flexible, transparent polypropylene (PP) surface exhibiting excellent repellency to liquids even including hexane (surface tension: ~18.6 mN/m). In particular, the surface also displays a superior dynamic wetting property as evidenced by the complete rebounding of hexane droplet (FIG. 4C). Such a superior wetting property is ascribed to the presence of pillar arrays decorated with doubly reentrant structures (FIGS. 4D, 4E, and 4F), which are faithfully transferred from their masters using CECE with the time and cost several orders of wetting property was observed until the buckling cycles are up to 100,000 and 70,000, respectively (FIG. 4G). In contrast, for the counterparts based on rigid materials, the surfaces are easily broken and their liquid repellences are lost after only several cycles of buckling. These complicated reentrant structures can also be fabricated on other chemically inert materials, e.g., polyethylene (PE), thus offering the potential to achieve a wide range of functionalities.

Figure 4H:
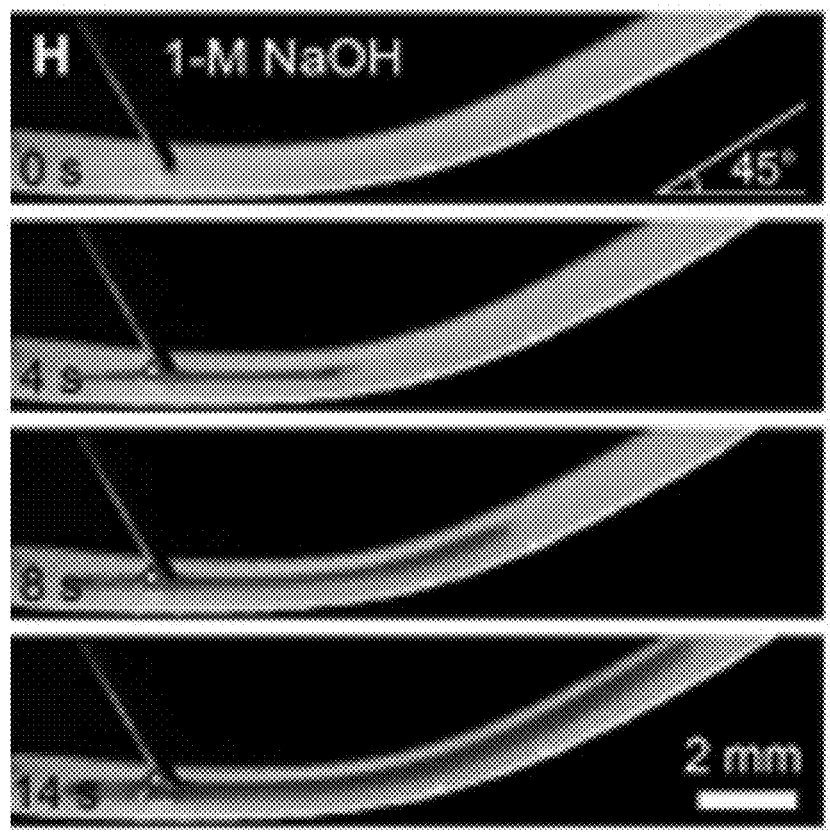
FIG. 4H shows a flexible and anti-corrosion liquid rectifier. Time-lapse photographs showing 1-M NaOH solution directionally spreading upward on a curved rectifier. The solution was fed onto the surface at a rate of 20 L/min.
Figure 4I:
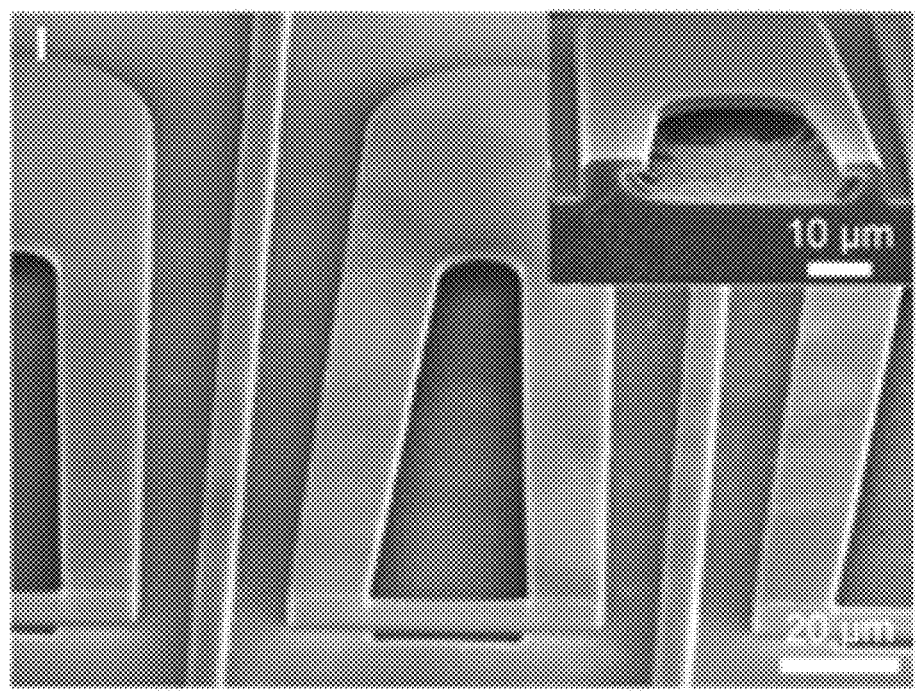
FIG. 4I shows the SEM image of the as-fabricated plastic rectifier. Inset is a cross-sectional view of the reentrant structure.
Figure 4J:
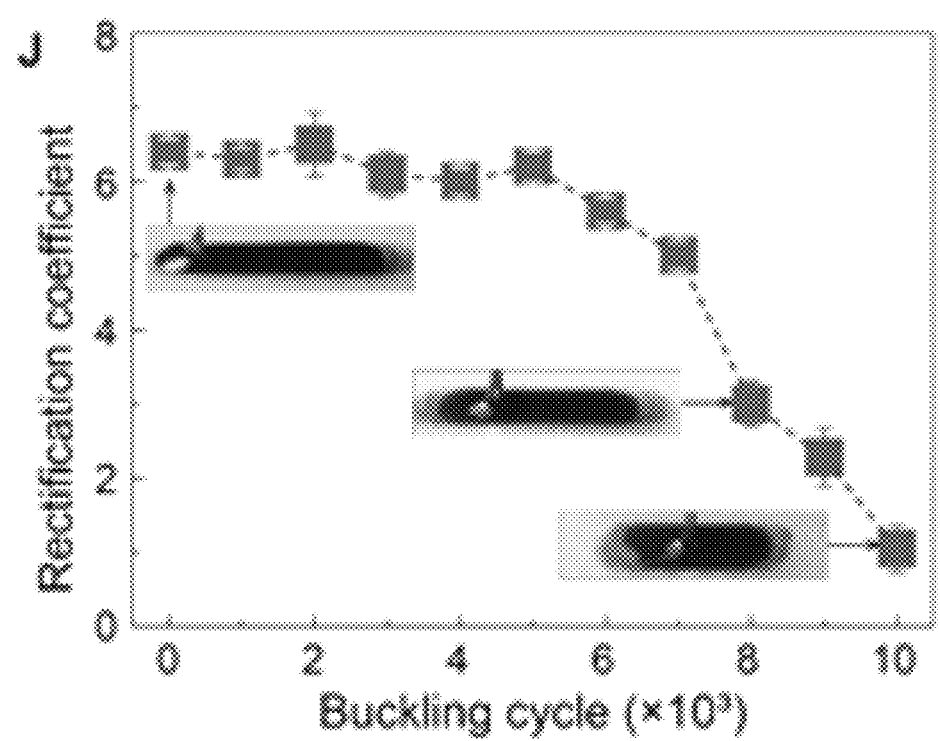
FIG. 4J shows the evolution of the rectification coefficient of the liquid rectifier during the robustness test against buckling.

FIG. 4H show the spontaneous and directional spreading of 1-M NaOH liquid along the as-fabricated liquid diode device based on PE material. Different from the liquid diode fabricated on rigid silicon, the use of PE substrate not only endows a high degree of flexibility, but also imparts enhanced chemical stability against corrosives. FIG. 4I shows the morphology of the PE rectifier, which is orderly decorated with capillary channels and reentrant structures (highlighted by the inset of FIG. 4I). The liquid diode displays very stable liquid rectification performance even after 6,000 buckling cycles, suggesting its unprecedented robustness (FIG. 4J). Such a flexible and mechanochemically robust rectifier is potentially suitable for adhering onto complex surfaces—in the form of adhesive tape—for the directional transport of diverse fluids.

Taken together, it is demonstrated that CECE imparts various important merits—including broad material compatibility, high resolution, rapid and mass production, high accessibility, and low cost—for the construction of true 3D architectures. In particular, CECE expands the capability of material choices from limited base materials (e.g., Si and photoresist) to a broad range of engineering materials (e.g., polymers, and other printable materials including $SiO_2$, metal, ceramic). Polymers such as UV curable resins, thermosets, thermoset metals and thermoplastics. Therefore, CECE promises to pave the road for transferring biomimetic materials into real-world applications. A further breakthrough with CECE in several directions is expected. For example, the complexity of processible structures can be further extended (e.g., an array of micro helixes) by using more broadly tunable mold materials or realize greater diversity of functions (e.g., self-adaptive, layer-heterogenic, stimuli-responsive, time-programmed) by creating structures of hybrid or composite materials. In a wider scope, it is anticipated that further fundamental study on the configurability of elastic cracks in terms of their orientation, length, and width would help advance the nanotechnologies for precise and scalable pattern formation in a broad range from atomic to macro scale.

Materials and Methods

Elastic crack formation. The elastic crack was generated by using modified soft lithography by controlling the curing dynamics of PDMS. First, RTV 615 PDMS (General Electric) was thoroughly mixed in a 10:1 mass ratio of prepolymer to curing agent and degassed in a vacuum desiccator for 30 min. Then, the PDMS mixture was poured on the closed-loop master and cured at room temperature (22° C.) for 24 h (denoted as Phase I). Note that, PDMS would cure sufficiently in 24 hours at 25° C. to permit handling, while the time window for the operation could be extended to 48 h. After that, the elastic crack was formed by carefully peeling off the cured PDMS. The PDMS was then baked for 30 min at 150° C. (denoted as Phase II). The temperature was gradually raised up (typically 10° C. per minute) from room temperature at the beginning of baking.

CECE-assisted molding process. The configurability of the elastic crack was utilized for replication of true 3D hierarchical structures. The casting step was conducted according to the procedure for the crack formation. Then the PDMS mold was attached on a glass slide for molding thermoplastic plate. The thermoplastic plate was hot-pressed with the PDMS mold at molten state for 1 min under a pressure of ~0.2 MPa. After that, the sandwich was cooled down to room temperature gradually while the pressure was kept. The product replica was obtained after the PDMS mold was peeled off. Thermoplastic materials such as low-density polyethylene (LDPE), linear low-density polyethylene (LL-DPE), high-density polyethylene (HDPE), polypropylene (PP), polystyrene (PS), fluorinated ethylene propylene (FEP), perfluoroalkoxy alkane (PFA), polyvinyl acetate (PVA), Poly(methyl methacrylate) (PMMA), polyurethan (PU), polycarbonate (PC), Polyvinyl Chloride (PVC), polyethylene terephthalate (PET), and acrylonitrile butadiene styrene copolymers (ABS) were employed for molding a set of beam structures with lengths.

Figure 12:
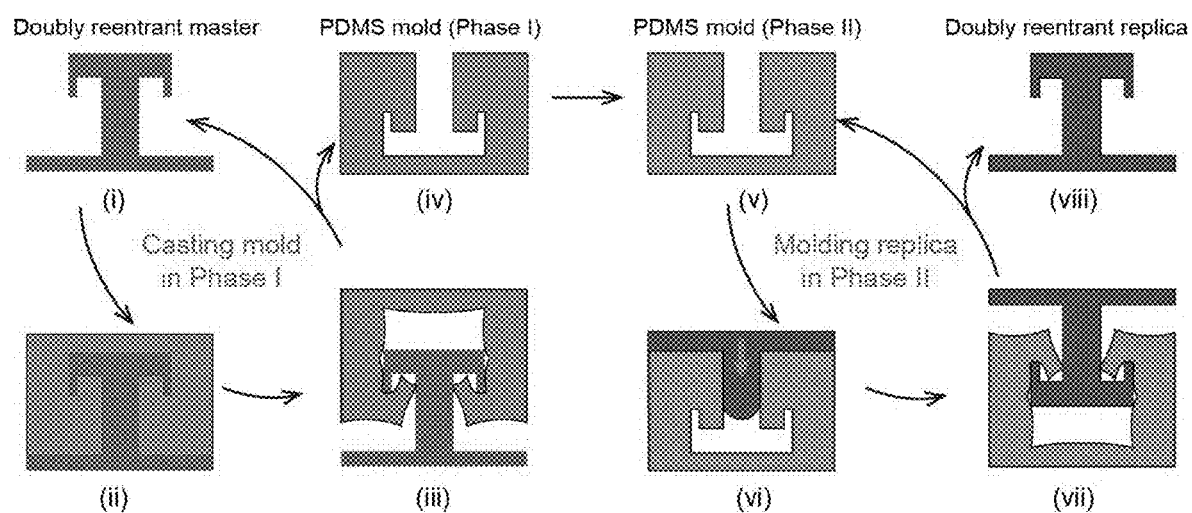
FIG. 12 shows schematic illustration of replicating doubly reentrant structure by CECE-assisted molding. The doubly reentrant structure is first transferred from a rigid master to a soft master (Phase I). In stage II, the soft master is transformed into a relatively rigid master for the faithful replication.

Biomimetic materials construction. The doubly reentrant structure was fabricated by TPA and then transfer-printed to PP material (FIG. 12). The liquid repellency was evaluated by testing the rebound of water, ethanol, and hexane droplets under Weber number ~0.5. The contact angles of the droplets were measured when the liquids reach static. The silicon liquid rectifier was fabricated using standard MEMS process, as described elsewhere (3) and then transfer-printed to PE material. The PE liquid rectifier was then treated with air plasma to decrease the apparent contact angles of water to ~15°. 1-M NaOH aqueous solution was fed onto the surface of the rectifier at a velocity of 20 L/min, and the spreading behavior was recorded with a camera.

Mechanical robustness test. The robustness of the biomimetic materials was tested using a homemade buckling device. A strip (20 mm×5 mm× 0.1 mm) was fixed on the device and was buckled repeatedly at a frequency of 50 times per minute. The curvature of the tested strip was repeatedly changed between 10 $cm^{-1}$ and 1 $cm^{-1}$. The liquid contact angles and the rectification coefficient were measured after every 1000 buckling cycles for monitoring the liquid repellency of the superomniphobic material and the transport performance of the liquid rectifier, respectively.

Fabrication of 3D Master Structures

The replication of several representative hierarchical structures were studied, including a close-loop array with hexagon lattice, a close-loop array with square lattice, an array of split ring, a beaded probe, a helix, an arch, and a bull, as shown in FIG. 3A-3G. These structures resemble to those emerging three-dimensional (3D) microstructures reported recently, and were fabricated by Photo lithography, soft lithography, and two-photon lithography as described below.

Arrays of closed loops. An over-exposure photolithography was employed for fabricating a large array of closed loops with diverse orientations. For a negative photoresist, i.e., SU-8, structures with vertical sides are formed when the recommended exposure dose is used during photolithography. When the SU-8 is overexposed, the tops of the structure expand in horizontal direction. Thus, when the overexposure reaches certain level, the expansion of the tops is so large that the adjacent structures are connected in the tops, forming closed loops.

Split rings. To generate master templates containing overhanging rings or split-rings, SU-8 structure containing 9-μm high ring arrays was firstly provided by photolithography. A PDMS stamp was then cast to obtain a complementary structure, which consisted of 8-μm diameter microwells with 5-μm diameter microposts standing in the centers of them. A plastic bar was then applied to squeeze the PDMS piece from one direction at once. The microposts were bent to the same direction and stick to the side wall of the microwells. After the PDMS piece was baked at 250° C. for 1 h, the microstructures on the PDMS were stabilized. This master could then be repeatedly used for molding thermoplastic replicas. The molded structure thereby contains split-rings. By adjusting the exposure dosage for the SU-8, split rings with different intervals or horizontally hanging closed loops can be fabricated. Enlarging the exposure dose increases the top thickness of the ring on the SU-8 master, thereby creating bigger room at the bottom of the PDMS structures.

Probe, helix, arch, and bull. These structures were fabricated by two-photon absorption (TPA) using a 3D laser lithography system (Nanoscribe GmbH). The photoresist IP-Dip was drop-cast onto a fused silica substrate, and a 60× objective lens was immersed directly in the photoresist. The 3D microstructures were point-by-point cured by direct laser writing according to the design. After laser writing, the structures were developed in propylene glycol monomethyl ether acetate (PGMEA) for 20 min, rinsed in isopropyl alcohol, and dried with nitrogen gas.

Mechanical Dynamics of PDMS Associated with its Curing Dynamics

Crosslinking. In this work, PDMS room temperature vulcanized silicone (RTV615) supplied by Momentive was used. RTV615 contains two components: (a) RTV A that contains a dimethylvinyl terminated pre-polymer and a Pt-catalyst, and (b) RTV B that contains a cross-linker with several hydride groups. In the presence of the Pt catalyst, the hydrosilane bond of the cross-linker (≡SiH) can add into the carbon-carbon double bond of the pre-polymer through hydrosilylation. In this way, the per-polymer chains cross-link into a polymer network.

Dynamic control of Young's modulus. Young's modulus E of the PDMS can be controlled by adjusting the curing temperature, curing time, and mixing ratio of the components. Previously, multi-chain network models have been established for better understanding the 3D stress-strain relationship of the elastic solid rubbers. The most basic theoretical approach is to assume Gaussian statistics, which proposes a three-chain network model. E is deduced to be directly proportional to both the chain density n (i.e., the number of chains per unit volume) and the temperature T, as shown by equation $E=3nkT$, where k is the Boltzmann's constant.

In the present invention, PDMS with different mixing ratios are cured in two steps, i.e., PDMS is cured firstly at 25° C. for 12 h (Phase I), and further at 150° C. for 30 min (Phase II). Stain-stress tests were performed after the curing process. The results are shown in FIG. 5A-5C. In phase I, the PDMS is cured at a lower curing temperature, leading to a relatively looser packing of the PDMS network as opposed to that cured at a higher curing temperature. Since the curing time is much shorter than that needed for complete polymerization, PDMS is not completely cross-linked yet at this stage. Therefore, Young's modulus of the PDMS in Phase I is very low. In Phase II, PDMS is further baked at 150° C. for 30 min. In this stage, PDMS becomes fully polymerized, and the baking at high temperature will tighten the PDMS network, leading to higher Young's modulus, which is 1-2 orders of magnitude higher than that in Phase I.

RTV615 is designed for using with an optimum ratio of pre-polymer to cure agent $R_{base/cure}$ equals to 10. Changing the mixing ratios of the PDMS will alter the polymerization kinetics. Decreasing $R_{base/cure}$ (e.g., from 10 to 5) promotes the crosslinking rate of PDMS, resulting in enhanced stiffness of the PDMS in Phase I, while the final stiffness in Phase II does not change much since the final polymer networks produced using these ratios are similar. However, a much higher concentration ($R_{base/cure}$<5) of the curing agent causes a decrease of Young's modulus both in Phase I and II, because the excess curing agent dilutes the network. On the other hand, when the $R_{base/cure}$ is above 10, the curing rate is reduced, and the average chain length becomes low, resulting in decreased Young's modulus of the PDMS in both Phases I and II.

Degradation at high temperatures. PDMS soft mold can be used for thermomolding of plastics such as PFA and PET at temperatures higher than the producer-recommended maximum working temperature of PDMS (204° C.) for a few times. The lifespan of PDMS is limited owing to the degradation at such high temperatures. The degradation is resulted from the Si—O bond fracture in the presence of terminal groups, e.g., ≡Si—OH. The intermediate product of the degradation can be regarded as a complex with a pentavalent Si-atom, and a hydrogen bond between the hydrogen from the ≡Si—OH and the oxygen from the siloxane. The Si—C bond fracture results in methane production. The decomposition leads to a decrease in the molecular weight of PDMS, hence resulting in an increased rigidity.

Failure in True 3D Molding without Introducing CECE Principle.

To validate the necessity of using two-step curing of PDMS in CECE, two controlled experiments were performed. In one experiment, the PDMS mold was directly cured to Phase II before peeling it from the master. In the other experiment, a replica was directly molded by using the soft mold in Phase I. As showed in FIG. 6A-6B, both the experiments fail in the creation of configurable elastic cracks and thus no closed-loop replica was obtained.

Mechanism Study of CECE.

Finite Element Analysis (FEA) Model

Figure 7A:
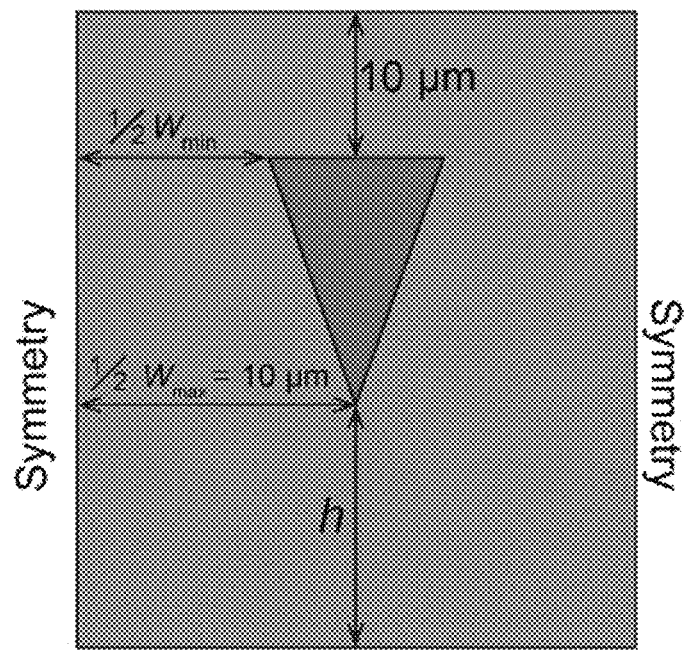
FIG. 7A shows geometry parameters of the simulation model.
Figure 7B:
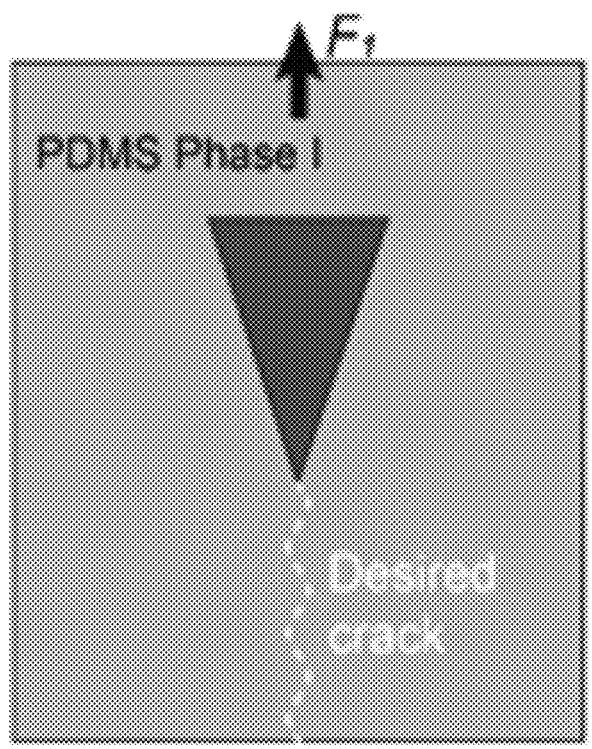
FIG. 7B shows the condition for releasing the PDMS mold during crack formation in Phase I.
Figure 7C:
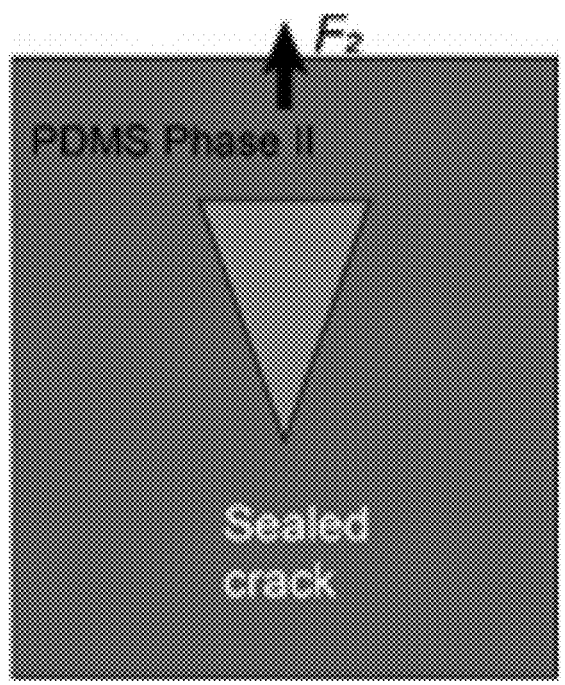
FIG. 7C shows the condition for releasing the PDMS mold during configurable seal/open in Phase II.

To elucidate the stress distribution along with the deformation of the PDMS during the two steps of molding, finite element analysis was performed using the structural mechanics module of COMSOL Multiphysics. The closed-loop arrays (FIG. 1C) were simplified as a 2D contact model (FIG. 7A-7C). For the casting step, the numerical model consisted of a PDMS mold and a SU-8 triangular pillar in the center, which were treated as a "contact pair". Material properties in the simulation are listed in Table 2. PDMS was defined as a hyperelastic material using the Neo-Hookean material model, and SU-8 was modeled as linear elastic material. The displacement was prescribed at the boundary of PDMS, which caused both PDMS and SU-8 to deform. The region where the von Mises stress exceeds the tensile stress of the PDMS indicates the site of potential failure.

TABLE 2

| Material properties in the simulation | |
|---|---|
| Materials | Parameters |
| PDMS in Phase I | Density: 970 kg/m$^3$ |
|  | Lame parameter λ: 714 kPa |
|  | Lame parameter μ: 179 kPa |
| SU-8 | Density: 1200 kg/m$^3$ |
|  | Young's modulus: 4 GPa |
|  | Poisson's ratio: 0.22 |
| PDMS in Phase II | Density: 970 kg/m$^3$ |
|  | Lame parameter λ: 4.66 MPa |
|  | Lame parameter μ: 517 kPa |
| PFA | Density: 2150 kg/m3 |
|  | Young's modulus: 650 Mpa |
|  | Poisson's ratio: 0.4 |

Study of the Controlled Formation of Elastic Crack

As discussed in the main text, to study the geometric effect on the controllability of the crack formation, a geometric model is provided. Briefly, a cracking coefficient q $W_{min}/W_h$ is defined to predict the location for the cracking formation, where $W_{min}$ is the smallest cross-section area of the neck region and h is the smallest cross-section area of the locked part. Similarly, to quantify the required maximum deformation of PDMS elastomer for complete release from the master, it is denoted a deformation coefficient $\varphi=W_{min}/W_{max}$, where $W_{max}$ is the largest cross-sectional area near the locked region. To provide guidance on the design of proper master structures, a phase diagram showing the effect of geometric parameters on the crack formation behavior is mapped out (FIG. 2B). The CECE will fail under the following two conditions. (1) when η<100%, the neck region breaks before the occurrence of the desired cracking along the peeling force direction; (2) when 1/φ<ε (where e is the ultimate elongation of elastomer at break, ε=250% for PDMS), the deformation of PDMS goes beyond its limit of the allowed elongation and as a result the mold cannot be released during the separation process.

The cracking behaviors were first investigated with three geometric conditions (i) η=30%, φ=15%, (ii) η=40%, φ=100%, and (iii) η=60%, φ=120%. For the two geometries (i) and (ii), which are out of the predicted successful CECE region showed in FIG. 2B, the cracking processes were totally out of control, resulting in the damage to the PDMS mold (FIG. 8A). For the geometry (iii), which is inside the predicted successful CECE region, a crack spontaneously formed in each closed loop of PDMS and the PDMS mold can be further used for replication. Then the FEA simulation was performed to reveal the principal stress distribution driving the cracking formation (FIG. 8B). For the PDMS in Phase I, the tensile stress is measured as ~1 MPa, and the ultimate elongation is ~250%. For the closed loops with $W_{min}$=4 μm and $W_{min}$=8 μm, q equals to 40% and 80%, respectively, both of which are smaller than 100%. In these cases, the von Mises stress mainly concentrates on the neck instead of the bottom area, and thus, the neck area of the PDMS mold will break first and the residual part will be trapped in the master. For the original templates with $W_{min}$=12 μm and $W_{min}$=16 μm, q equals to 120% and 160%, respectively, both of which greater than 100%, and thus, the bottom region breaks first. Meanwhile, for these cases 1/φ equals to 166.7% and 125%, respectively, both of which are smaller than the ultimate elongation of 250%. Therefore, the PDMS can be fully released from the original templates. The bottom thickness is then adjusted (h=15 μm, 10 μm, 5 μm, and 2 μm) while keeping the neck length constant ($W_{min}$=8 μm), decreasing the bottom thickness ensures the initial cracking to take place in the bottom region.

Study of the Configurable Seal/Open of Elastic Crack

The self-adaptivity of the elastic crack for configurable seal/open is studied by measuring the critical force $F_2$ to open the crack. The three-dimensional geometry for the test is shown in FIG. 9A. A set of closed loops (length l=15, 25, 35, 50, 70, 100 μm) on the same master made of polymeric materials were pulled out from the elastic cracks. These polymers possess different flexural modulus 6. The replica loop structures experience a drag during releasing from the mold through the cracks; as a result, replica structures with low a and large I were observed to be misshaped. The maximum length l of the faithfully released replicas was measured and recorded as the yield point of the material with specific σ. The yield points for the closed loops were checked (FIG. 9B) and then were converted to the force $F_2$, as showed in FIG. 2D in main text.

Figure 10:
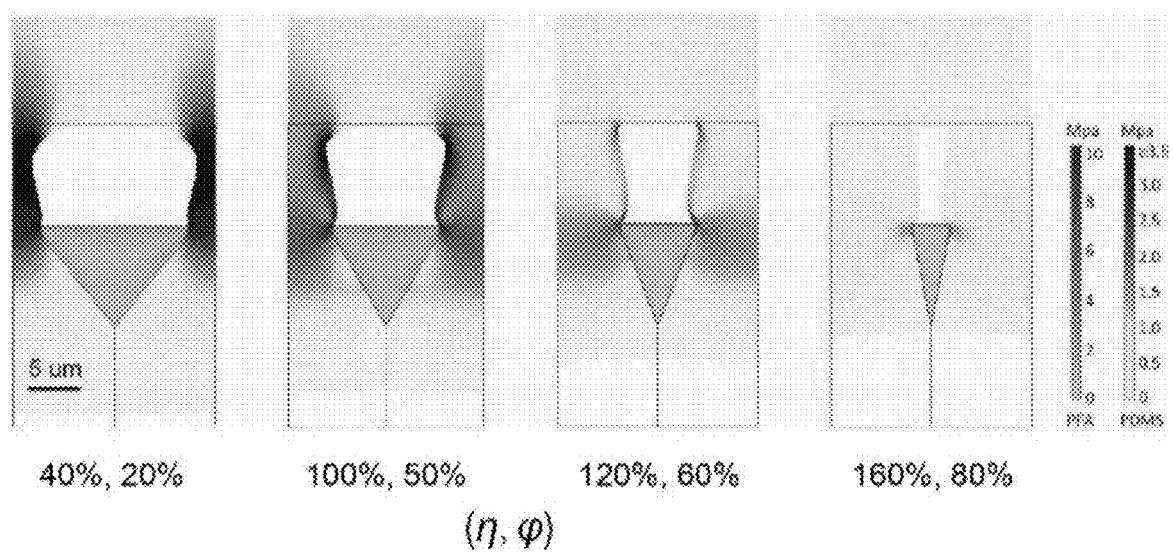
FIG. 10 shows the simulation results for selected geometries covered in the prediction map in FIG. 2D.
Figure 11A:
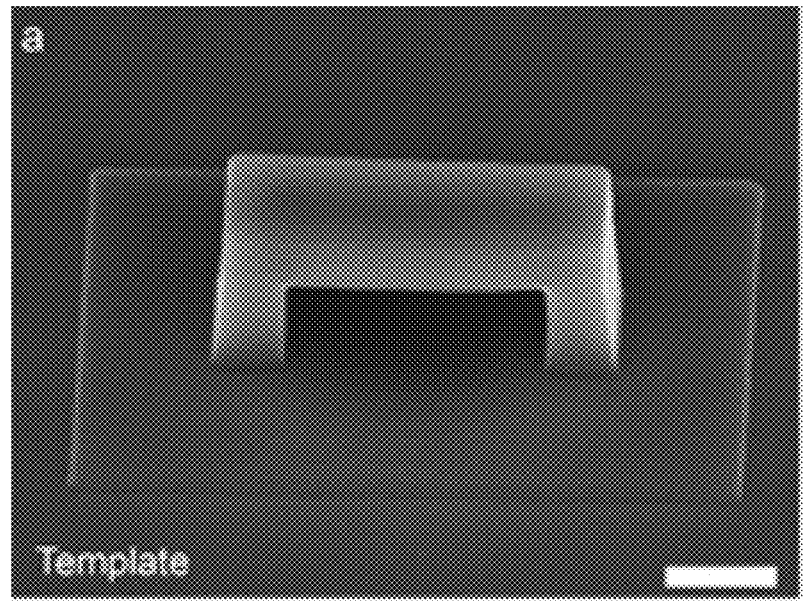
FIG. 11A shows the SEM image of the initial template of a micro arch for repeatability test.
Figure 11B:
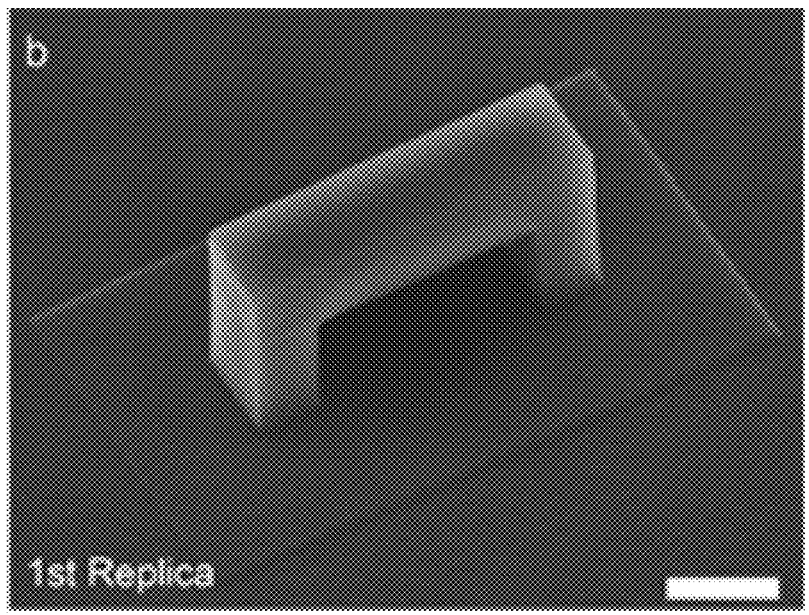
FIG. 11B shows the SEM image of the first replica of a micro arch for repeatability test.
Figure 11C:
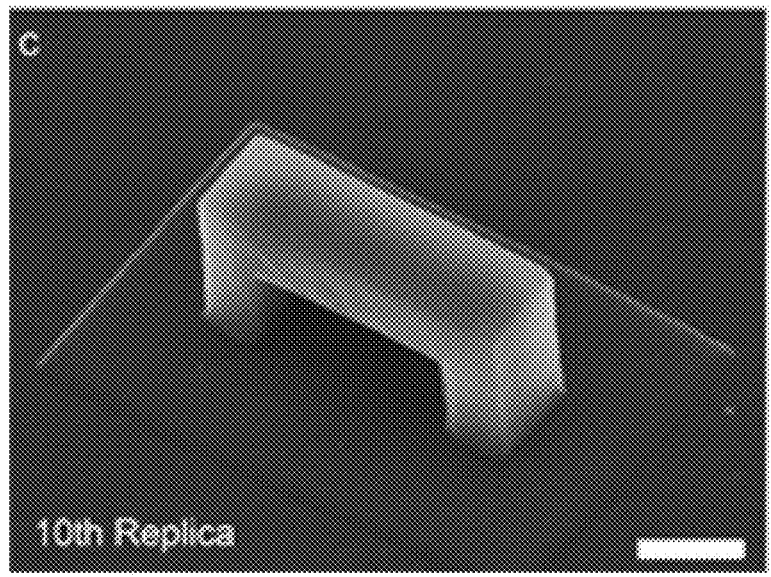
FIG. 11C shows the SEM image of the tenth replica of a micro arch for repeatability test.
Figure 11D:
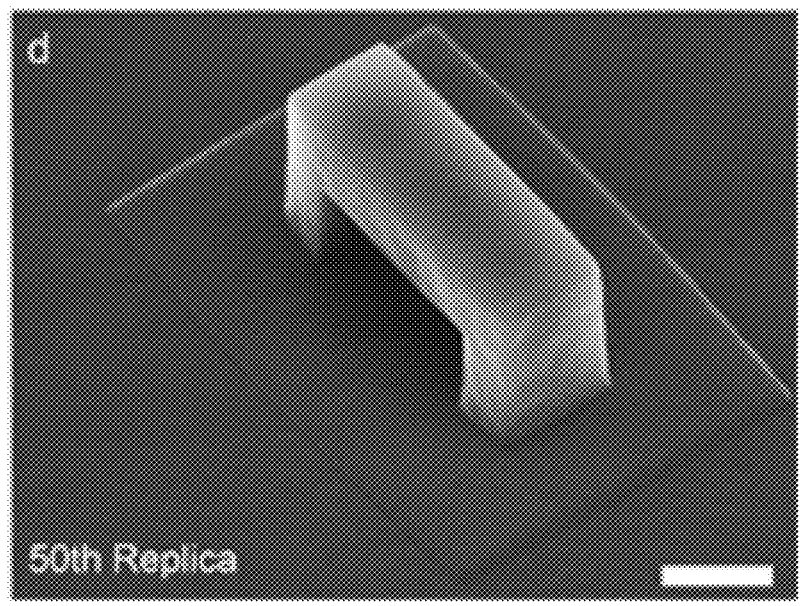
FIG. 11D shows the SEM image of the fiftieth replica of a micro arch for repeatability test.

The reopening of the elastic cracks is further simulated. A crack in the PDMS (Phase II) is pre-set in the bottom region of the closed loop. By increasing the neck length, the PDMS is easier to be fully released from the daughter structure, as shown in FIG. 10.

Replication Performance of CECE

The repeatability of the present method was evaluated by fabricating multiple replicas using the same soft mold and checking the replicas with SEM. The replicas were identical with the original template (FIG. 11A-11D). Therefore, the lifetime of the soft mold was conservatively estimated to be ≥50 times.

INDUSTRIAL APPLICATION

The present invention relates to a fabrication of three-dimensional (3D) hierarchical structures. More particularly, it relates to a method of fabricating three-dimensional (3D) hierarchical structures by harnessing the configurable elastic crack engineering.

What we claim:

1. A method of fabricating and mass-producing a three-dimensional hierarchical structure, the method comprising:
    a first phase comprising:
        using a three-dimensional hierarchical structure as a master structure;
        enclosing the master structure in an elastomer mold, wherein a Young's modulus of the elastomer mold is at least one order of magnitude lower than a Young's modulus of the master structure;
        removing the master structure from the elastomer mold, wherein one or more controlled cracks are formed in the elastomer mold along the direction of a vertical peeling force, and a cavity mold is formed with a shape of the master structure in the elastomer mold; and
        controlling the formation of the one or more controlled cracks in the elastomer mold by adjusting a curing temperature and a curing time of the elastomer mold, so that the one or more controlled cracks are formed at a locked region in the elastomer mold during the master structure removal, wherein the elastomer mold has a cracking coefficient η of at least 100% for preventing a neck region of the elastomer mold from breaking and a deformation coefficient φ during the first phase, wherein 1/φ is equal to or greater than the ultimate elongation at break of the elastomer mold so as to ensure that the elastomer mold is able to be separated from the master structure;
    wherein the cracking coefficient is computed by:

$\eta = W\text{min}/h$, wherein Wmin is the smallest width of the neck region; h is the height of the locked region, and 2 μm<h<15 μm;
    wherein the deformation coefficient is computed by:

$\varphi = W\text{min}/W\text{max}$, wherein Wmin is the smallest width of the neck region; Wmax is the largest width near the locked region;
    a second phase comprising:
        curing the elastomer mold at a temperature higher than the curing temperature during the first phase to enhance the stiffness, self-sealing and configurability of the elastomer mold;
        filling the cavity mold with a replica material and curing the replica material to fabricate a replica of the master structure; and
        removing the replica from the elastomer mold.

2. The method of claim 1, wherein the three-dimensional hierarchical structure comprises a closed-loop structure, a doubly reentrant structure, an arch, a high aspect ratio rod, a high aspect ratio two-cycle helix, or a 3D array.

3. The method of claim 1, wherein the elastomer mold has a local stress lower than a failure strength of the elastomer mold during fabricating.

4. The method of claim 1, wherein the replica material comprises a base material or an engineering material.

5. The method of claim 4, wherein the base material comprises silicon and a photoresist.

6. The method of claim 4, wherein the engineering material comprises a polymer or a printable material.

7. The method of claim 6, wherein the printable material comprises SiO$_2$, a metal, or a ceramic.

8. The method of claim 6, wherein the polymer comprises a UV curable resin, a thermoset, a thermoset metal, and a thermoplastic.

9. The method of claim 8, wherein the thermoplastic comprises low-density polyethylene (LDPE), linear low-density polyethylene (LLDPE), high-density polyethylene (HDPE), polypropylene (PP), polystyrene (PS), fluorinated ethylene propylene (FEP), perfluoroalkoxy alkane (PFA), polyvinyl acetate (PVA), Poly(methyl methacrylate) (PMMA), polyurethan (PU), polycarbonate (PC), Polyvinyl Chloride (PVC), polyethylene terephthalate (PET) and acrylonitrile butadiene styrene copolymers (ABS).

10. The method of claim 1, wherein the elastomer mold comprises polydimethylsiloxane (PDMS) polymer.

11. The method of claim 1, wherein the curing temperature and the curing time of the elastomer mold during the first phase is at 22 to 25° C. for 24 hours.

12. The method of claim 1, wherein the elastomer mold is cured by baking at 150° C. for 30 minutes during the second phase, and wherein the temperature gradually rises from room temperature at a rate of 10° C. per minute during the baking process.

13. The method of claim 1, wherein the elastomer mold is cured by baking at 250° C. for 1 hour during the second phase, and wherein the temperature gradually rises from room temperature at a rate of 10° C. per minute during the baking process.

* * * * *